United States Patent
Arakawa

(10) Patent No.: US 7,961,227 B2
(45) Date of Patent: Jun. 14, 2011

(54) DIGITAL CAMERA

(75) Inventor: Kenji Arakawa, Kyoto (JP)

(73) Assignee: Panasonic Corporation, Osaka (JP)

(*) Notice: Subject to any disclaimer, the term of this patent is extended or adjusted under 35 U.S.C. 154(b) by 0 days.

(21) Appl. No.: 12/458,311

(22) Filed: Jul. 8, 2009

(65) Prior Publication Data

US 2009/0284626 A1  Nov. 19, 2009

Related U.S. Application Data

(62) Division of application No. 11/363,168, filed on Feb. 28, 2006, now abandoned.

(30) Foreign Application Priority Data

Feb. 28, 2005 (JP) .................................. 2005-053484

(51) Int. Cl.
*H04N 9/73* (2006.01)
*H04N 5/235* (2006.01)
(52) U.S. Cl. ................ 348/223.1; 348/225.1; 348/229.1
(58) Field of Classification Search ............... 348/223.1, 348/225.1, 229.1, 362
See application file for complete search history.

(56) References Cited

U.S. PATENT DOCUMENTS

| 6,591,008 | B1 | 7/2003 | Surve et al. |
| 2002/0085100 | A1 | 7/2002 | Takahashi |
| 2003/0035652 | A1 | 2/2003 | Kubo et al. |
| 2005/0156942 | A1 | 7/2005 | Jones |

FOREIGN PATENT DOCUMENTS

| JP | 2000-152276 | 5/2000 |
| JP | 2003-116147 | 4/2003 |

*Primary Examiner* — Kelly L Jerabek
(74) *Attorney, Agent, or Firm* — McDermott Will & Emery LLP

(57) ABSTRACT

The digital camera comprises: an image-taking device for converting light from a subject to a video signal and outputting the video signal; an image processor which has a gain adjuster for performing gain adjustment individually for respective color information of R, G, B of the video signal outputted from the image-taking device, and an image data converter for converting the adjusted video signal outputted from the gain adjuster into image data; a displaying device for displaying the image data; a setting device; and a controller for controlling the gain adjuster to perform RGB color discrimination of the video signal and gain adjustment individually on the respective color information by a command from the setting device.

6 Claims, 27 Drawing Sheets
(13 of 27 Drawing Sheet(s) Filed in Color)

F I G. 5
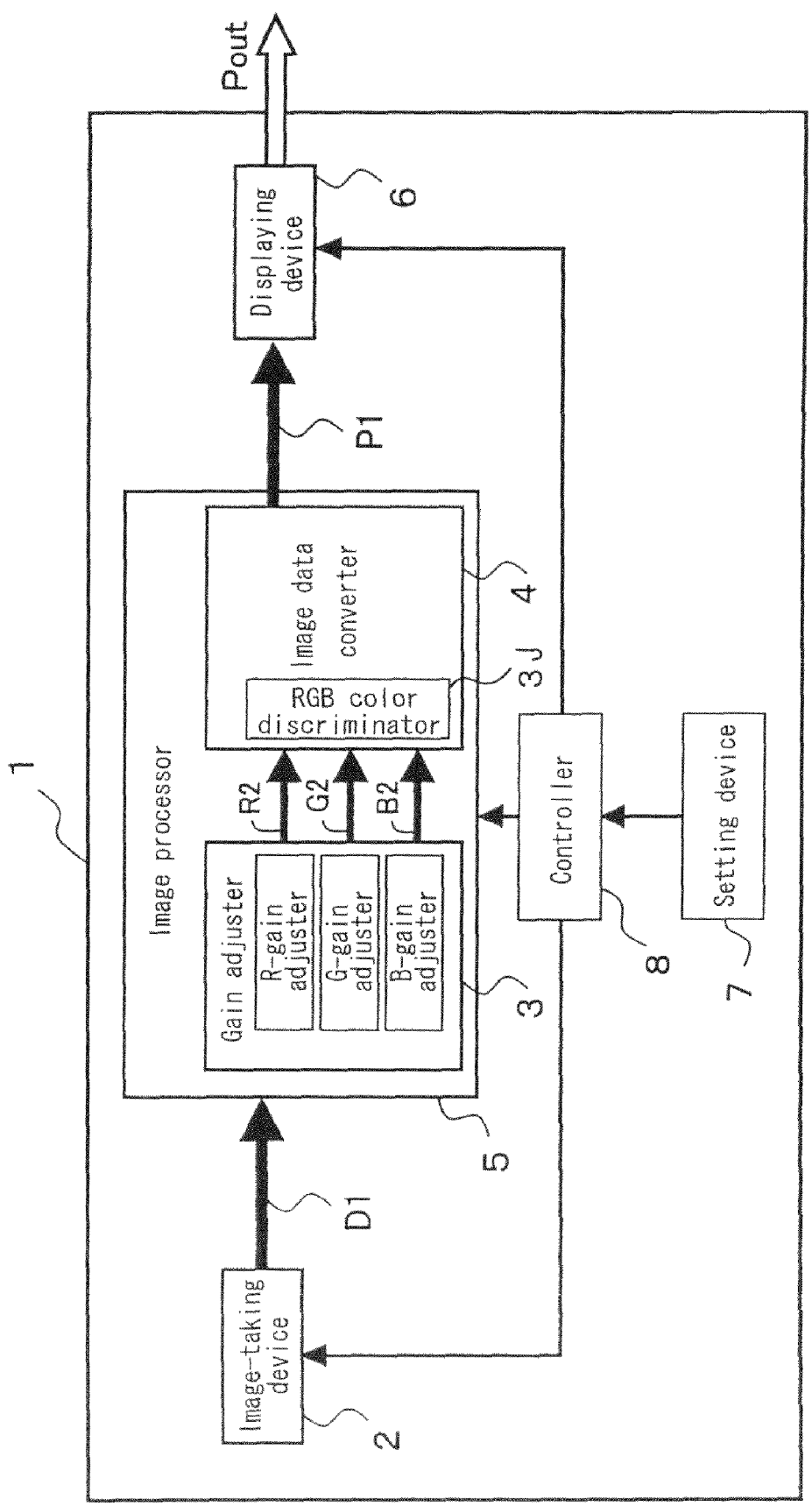

FIG. 11
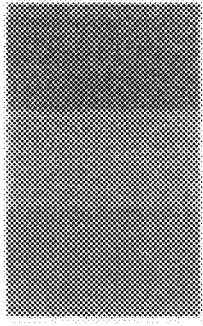
Light from subject
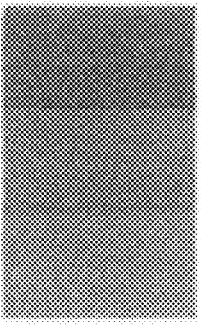
Color vision recognized by 2nd color-vision handicapped
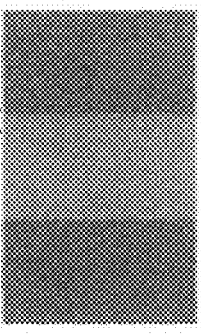
Color vision recognized by 1st color-vision handicapped
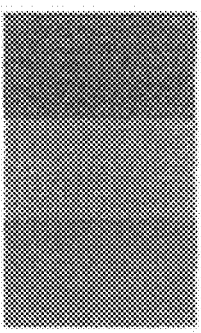
Color vision recognized by color-vision nonhandicapped F I G. 1 2 C
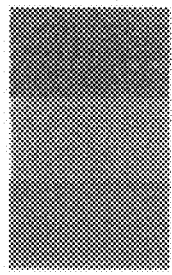
Light from subject
Set 2nd color-vision handicapped by key
Digital camera
1
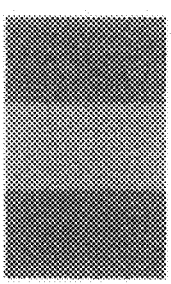
Display image Pout
F I G. 1 2 B
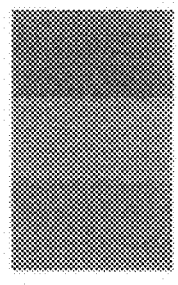
Light from subject
Set 1st color-vision handicapped by key
Digital camera
1
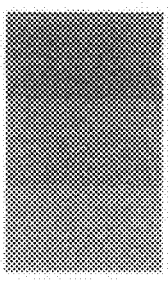
Display image Pout
F I G. 1 2 A
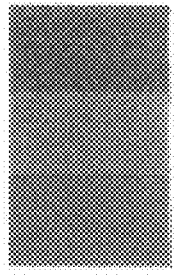
Light from subject
Set color-vision nonhandicapped by key
Digital camera
1
Display image Pout

F I G. 14 A

Light from subject 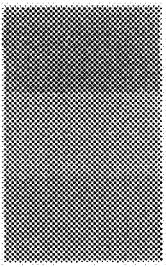

Set color-vision nonhandicapped & change of color boundary luminance by key

Digital camera

Display image  Pout

F I G. 14 B

Light from subject 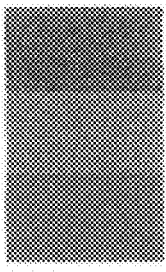

Set 1st color-vision handicapped & change of color boundary luminance by key

Digital camera

Display image 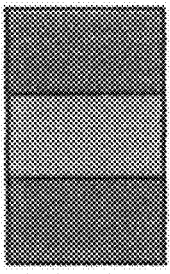 Pout

F I G. 14 C

Light from subject 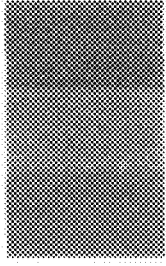

Set 2nd color-vision handicapped & change of color boundary luminance by key

Digital camera

Display image 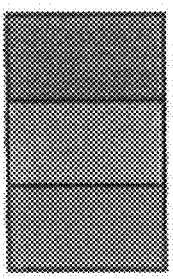 Pout

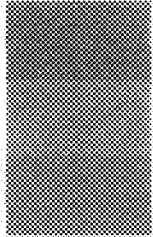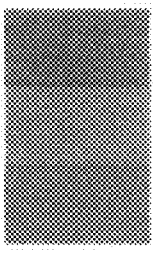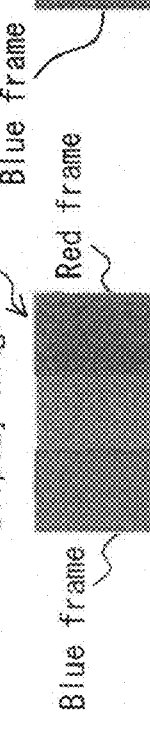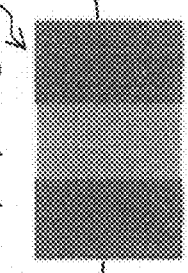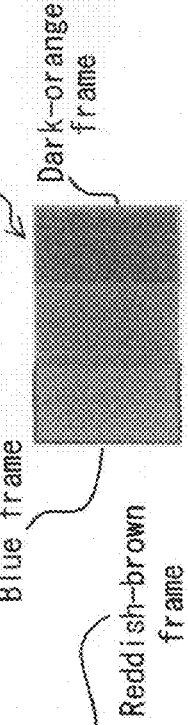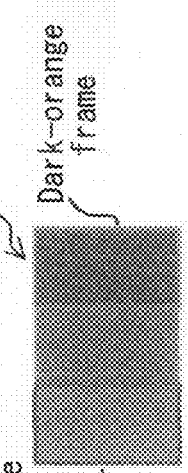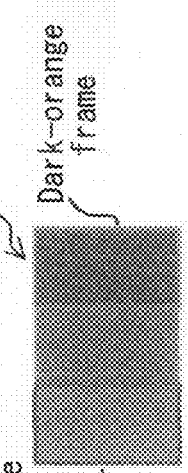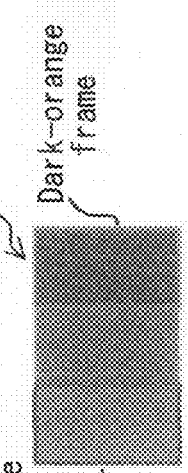
FIG. 15A / FIG. 15B / FIG. 15C

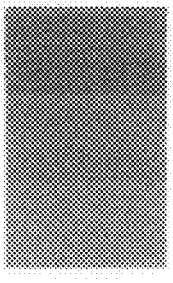
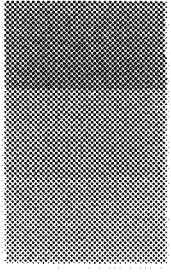
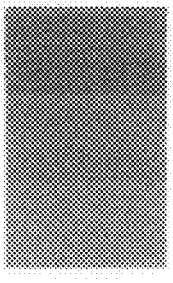
FIG. 16C
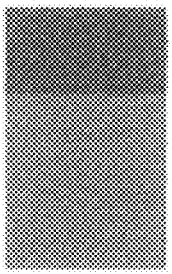
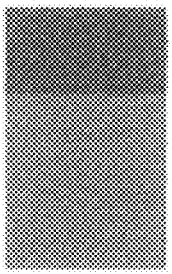
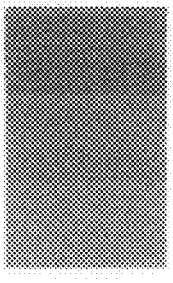
FIG. 16B
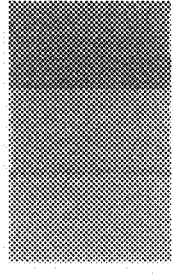
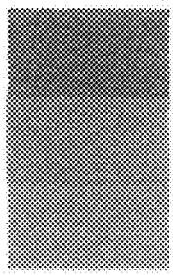
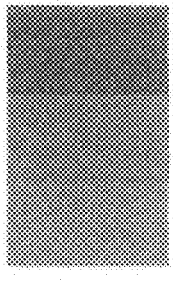
FIG. 16A F I G. 19B
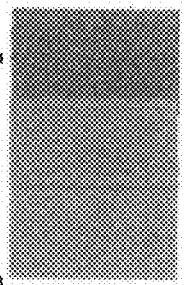
Light from subject
Set 1st color-vision handicapped & change of luminance in boundary of same colors by key
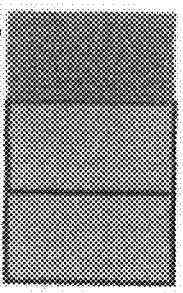
Digital camera
1
Display image Pout
F I G. 19A
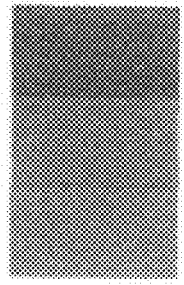
Light from subject
Set 1st color-vision handicapped by key
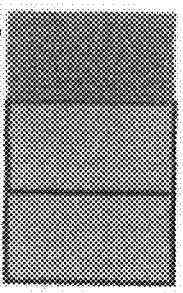
Digital camera
1
Display image Pout

FIG. 22C

Light from subject 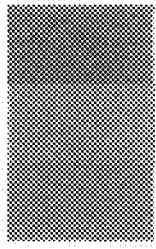 → Digital camera → Display image Pout 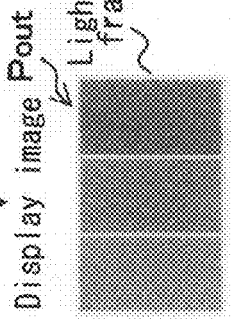 Light-blue frame Set 2nd color-vision handicapped & change of color boundary hue by key → 1

FIG. 22B

Light from subject 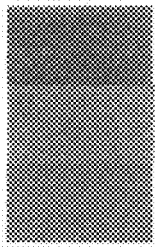 → Digital camera → Display image Pout 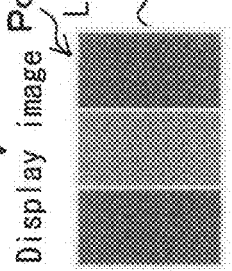 Light-blue frame Set 1st color-vision handicapped & change of color boundary hue by key → 1

FIG. 22A

Light from subject 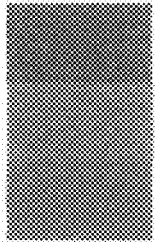 → Digital camera → Display image Pout 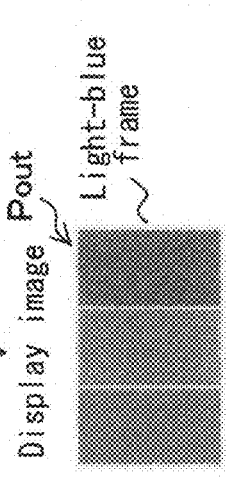 Light-blue frame Set color-vision nonhandicapped & change of color boundary hue by key → 1

FIG. 27A
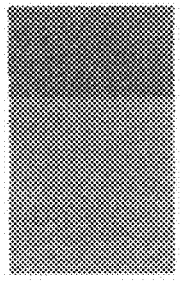
Light from subject
→ Digital camera (1) → 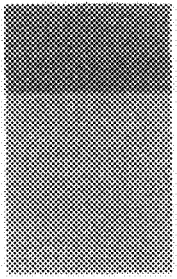 Display image Pout
Set 1st color-vision handicapped by key
FIG. 27B
Light from subject
→ Digital camera (1) → 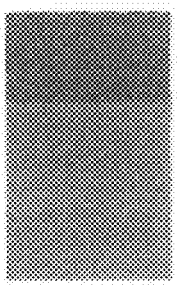 Display image Pout
Set 1st color-vision handicapped & change of luminance in same-color regions & designation of green to have no gain adjustment by key

DIGITAL CAMERA

This application is a divisional of U.S. application Ser. No. 11/363,168, filed Feb. 28, 2006, now abandoned which claims priority to Japanese Application No. JP 2005-053484, filed Feb. 28, 2005, the entire contents of each of which are incorporated herein by reference.

BACKGROUND OF THE INVENTION

1. Field of the Invention

The present invention relates to a digital camera that comprises a solid image sensor element (referred to as an image sensor element hereinafter) such as a CCD (Charge Coupled Device), a CMOS (Complementary Metal Oxide Semiconductor) and, more particularly, to a technique for reproducing colors that can be recognized by the color-vision handicapped.

2. Description of the Related Art

In the field of cellular engineering, it is known to reproduce the colors recognized by the color-vision handicapped through performing, using a computer, arithmetic operation of images taken by a digital camera.

However, with a conventional digital camera that takes pictures in full colors, the color-vision nonhandicapped cannot understand in what tone of colors the color-vision handicapped recognize the colors they cannot discriminate. Furthermore, if videos filmed by a digital camera are arithmetically operated by a computer, they cannot be checked immediately and there requires an extra work for conversion.

SUMMARY OF THE INVENTION

The main object of the present invention therefore is to achieve a digital camera capable of grasping the discriminating state of the color-vision handicapped, and to enable the color-vision handicapped to recognize neighboring colors that are not identifiable by the color-vision handicapped as being different colors.

In order to overcome the foregoing problems, the digital cameral of the present invention comprises: an image-taking device for converting light from a subject to a video signal and outputting the video signal; a gain adjuster which performs gain adjustment individually for respective color information of R, G, B of the video signal outputted from the image-taking device, and outputs an adjusted video signal; an image data converter for converting the adjusted video signal outputted from the gain adjuster into image data; a displaying device for displaying the image data; a setting device in which gain adjusting amounts for the respective color information are set; and a controller for controlling the gain adjuster such that gain adjustment is performed individually on the respective color information according to the gain adjusting amounts set in the setting device.

With this, it is possible for the gain adjuster to perform gain adjustment individually on the respective color information of R, G, B. Thus, the color-vision nonhandicapped can understand how it looks to the color-vision handicapped of various degrees.

In the above-described structure, for the gain adjuster, there are some preferable forms as described in the followings.

That is, there may be a case where it is constituted such that the video signal obtained by the image-taking device is a color signal of Cy (cyan), Mg (magenta), Ye (yellow), G, and, after converting the color signal of Cy, Mg, Ye, G into a color signal of R, G, B by a complementary-color/primary-color converter, gain adjustment for each color is performed.

With this, in the case of the image sensor element comprising a color filter of complementary colors Cy, Mg, Ye, G, the same gain adjustment as that of the primary colors R, G, B can be performed by performing gain adjustment after converting them to R, G, B by the complementary-color/primary-color converter. In other words, the gain adjustment values can be used in common even if the color filter of the image sensor element is changed.

In the above-described structure, the followings are also preferable. That is, the digital camera further comprises a storage device for storing the gain adjusting values of the respective color information according to degrees of color-vision impairment, wherein: the setting device has the degrees of the color-vision impairment set therein instead of the gain adjusting amounts; and the controller reads out, from the storage device, the gain adjusting value corresponding to the degree of the color-vision impairment set in the setting device, and transmits the read out gain adjusting value to the gain adjuster.

In this form, the gain adjusting values for each color according to the degrees of the color-vision impairment are stored in the storage device. Examples of such values may be: a first color-vision gain adjusting value for performing gain adjustment to provide the color information of the first color-vision impairment with which the red cone of an eyeball does not function; a second color-vision gain adjusting value for performing gain adjustment to provide the color information of the second color-vision impairment with which the green cone of the eyeball does not function; and a third color-vision gain adjusting value for performing gain adjustment to provide the color information of the third color-vision impairment with which the blue cone of the eyeball does not function. The controller searches the storage device according to the degree of the color-vision impairment from the setting device for reading out the corresponding gain adjusting value, and transmits the read out gain adjusting value to the gain adjuster. The gain adjuster performs the gain adjustment in accordance with the gain adjusting value from the controller. Thereby, it is possible for the color-vision nonhandicapped to understand how it looks to the color-vision handicapped of each degree.

In the above-described structure, the followings are also preferable. That is, the digital camera further comprises: a color discriminator for discriminating a boundary between two color regions which are adjacent to each other in the image digital data on a plane; and a superimposing device that generates superimposing data, which is image data where at least one of luminance, hue, or saturation is changed in the boundary discriminated by the discriminator, and superimposes the superimposing data on the image data, wherein the controller controls the color discriminator and the superimposing device.

With this, the boundary between the color regions can be easily recognized by the difference of luminance even through the colors cannot be discriminated. It is effective to superimpose bright superimposing data when the image data is dark, and to superimpose dark superimposing data when the image data is bright. Further, when the image data is relatively bright, a specific recognizable color is sued for expressing the boundary between the color regions so that the part expressed by the color can be easily recognized as the boundary between the color regions.

Furthermore, in the above-described structure, the following form is preferable. That is, the image data converter outputs both of image data obtained by converting the video signal with no gain adjustment, and image data obtained by converting the adjusted video signal with gain adjustment; the color discriminator further discriminates a difference between color information of the two color regions of the image data that is obtained by converting the video signal and color information of the two color regions of the image data that is obtained by converting the adjusted video signal; and the superimposing device generates the superimposing data exclusively for the boundary between the two color regions that satisfy following conditions of A), B) from a result of discrimination by the color discriminator, and superimposes the superimposing data on the image data that is obtained by converting the adjusted video signal.

A) In the image data obtained by converting the video signal, color information differs between the two color regions.

B) In the image data obtained by converting the adjusted video signal, hues are same for the two color regions.

With this, it is possible to superimpose the superimposing data for making the boundary between the color regions easily recognizable, only when the color information of the gain adjusted color regions turns the same color as that of the color information of the image data adjacent thereto so that the boundary between the color regions cannot be discriminated.

In the above-described structure, the followings are preferable. That is, the image processor outputs both of image data obtained by converting the video signal with no gain adjustment, and image data obtained by converting the adjusted video signal with gain adjustment; the color discriminator further discriminates a difference between color information of the two color regions of the image data that is obtained by converting the video signal and color information of the two color regions of the image data that is obtained by converting the adjusted video signal; and the superimposing device generates superimposing data, which is image data where at least one of luminance, hue, or saturation is changed in either one of the two color regions that satisfy following conditions of A), B) from a result of discrimination by the color discriminator, and superimposes the superimposing data on the image data.

A) In the image data obtained by converting the video signal, color information differs between the two color regions.

B) In the image data obtained by converting the adjusted video signal, hues are same for the two color regions.

With this, it becomes easier to recognize when the periphery of the color regions of different colors turn the same color due to the gain adjustment.

Further, in the above-described structure, the followings are preferable. That is, the digital camera further comprises: a color discriminator for discriminating a boundary between two color regions which are adjacent to each other in the image digital data on a plane, and for discriminating color information of the boundary; a storage device for storing color information of the image data obtained by converting the adjusted video signal; and an superimposing device that generates superimposing data, which is image data where the color information of the boundary discriminated by the color discriminator is converted to the color information that is not stored in the storage, and superimposes the superimposing data on the image data, wherein the controller controls the color discriminator and the superimposing device.

With this, the boundary between the color region with changed color and the periphery thereof can be expressed by a recognizable color, so that change of color can be easily recognized.

Moreover, in the above-described structure, the followings are preferable. That is, the digital camera further comprises: a color discriminator for discriminating a boundary between two color regions which are adjacent to each other in the image digital data on a plane; a storage device for storing an unexpressed color for showing a color that cannot be obtained from the color information that is gain-adjusted according to the gain adjusting amount set in the setting device; and a superimposing device that generates superimposing data, which is image data where the color information of the boundary discriminated by the color discriminator is converted to the unexpressed color that is stored in the storage, and superimposes the superimposing data on the image data, wherein the controller controls the color discriminator and the superimposing device.

With this, the boundary between the color region with changed color and the periphery thereof can be expressed by a recognizable color, so that change of color can be easily recognized.

In the above-described structure, the followings are preferable. That is, the digital camera further comprises a timer for outputting interruption by every prescribed time, wherein the controller controls the superimposing device to switch superimposing and non-superimposing of the superimposing data for every interruption outputted from the timer.

With this, when the neighboring color regions turn the same color due to the gain adjustment, the color regions are flash-displayed by every prescribed time. Thereby, it is possible to improve the visibility of the boundary.

In the above-described structure, the followings are preferable. That is, the storage device further stores unadjusted color that has no gain adjustment performed. The digital camera further comprises: a stored color comparator which compares color information of each of the color regions in the image data obtained by converting the video signal with the unadjusted color and, when consistent, outputs the image data obtained by converting the video signal to the color regions, while outputting the image data obtained by converting the adjusted video signal to the color regions when inconsistent.

With this, a specific color (wavelength) is outputted without gain adjustment in accordance with each characteristic of the color-vision handicapped. As a result, in the case where the color information is corrected in one's brain by the memorized color of the color-vision handicapped, it is possible to know how it is corrected even though it is actually a different color.

It may be formed to adjust a value of image data itself instead of superimposing the superimposing data on the image data.

As described above, the present invention enables individual gain adjustment performed on respective information of colors R, G, B. Thus, the color-vision nonhandicapped can understand how it looks to the color-vision handicapped of various degrees. Further, when there are unidentifiable color regions within the filming area being adjacent to each other, it is possible for the color-vision handicapped to identify the boundary between the color regions by flashing the color regions, etc. Moreover, the color-vision nonhandicapped can use it as a judging material for achieving barrier-free color visions.

BRIEF DESCRIPTION OF THE DRAWINGS

The file of this patent contains at least one drawing executed in color. Copies of this patent with color drawing(s) will be provided by the Patent and Trademark Office upon request and payment of the necessary fees.

Other objects of the present invention will become clear from the following description of the preferred embodiments and the appended claims. Those skilled in the art will appreciate that there are many other advantages of the present invention possible by embodying the present invention.

FIG. 5 is a block diagram for showing the structure of a digital camera as a modification of the first embodiment;

FIG. 11 is an illustration showing color visions of the color-vision nonhandicapped, the first color-vision handicapped, and the second color-vision handicapped according to the third embodiment;

FIG. 12A-12C are illustrations for describing action of the digital camera according to the third embodiment;

FIG. 14A-14C are illustrations for describing action of the digital camera according to the fourth embodiment;

FIG. 15A-15C are illustrations for describing action of a digital camera according to a fifth embodiment of the present invention;

FIG. 16A-16C are illustrations for describing the subject of a sixth embodiment of the present invention;

FIG. 19A-19B are illustrations for describing action of the digital camera according to the sixth embodiment;

FIG. 22A-22C are illustrations for describing action of a digital camera according to an eighth embodiment of the present invention;

FIG. 27A-27B are illustrations for describing action of the digital camera according to the eleventh embodiment.

DETAILED DESCRIPTION OF THE INVENTION

Preferred embodiments of the present invention will be described hereinafter by referring to the accompanying drawings.

First Embodiment

Figure 1:
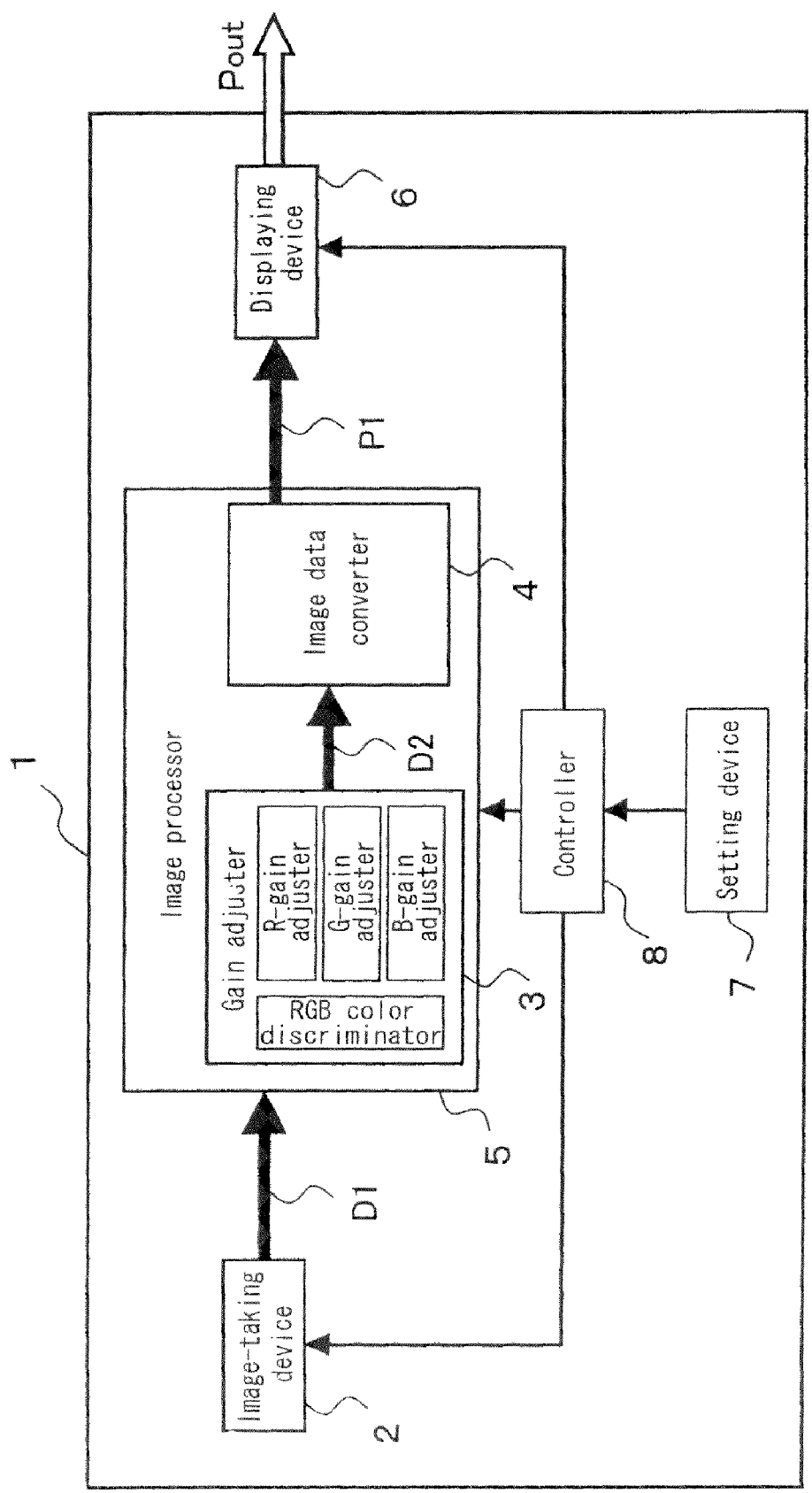
FIG. 1 is a block diagram for showing the structure of a digital camera according to a first embodiment of the present invention.

FIG. 1 is a block diagram for showing the structure of a digital camera 1 according to a first embodiment of the present invention. In FIG. 1, reference numeral 2 is an image-taking device which converts light from a subject into video signal D1 that corresponds to R, G, B by a solid image sensor element such as a CCD and a CMOS, and outputs the converted video signal D1. Numeral reference 3 is a gain adjuster which performs gain adjustment individually on information of each color R, G, B of the video signal D1 outputted from the image-taking device 2, and outputs adjusted video signal D2 as a result thereof. 4 is an image data converter for converting the adjusted video signal D2, which is outputted from the gain adjuster 3, into image data P1. 5 is an image processor constituted of the gain adjuster 3 and the image data converter 4. 6 is a displaying device such as an organic EL display for displaying the image data P1 as display image Pout. 7 is a setting device for giving a command to start filming, end filming, set ON/OFF of display output, and to change gain adjustment values, etc. 8 is a controller which controls the gain adjuster 3 to perform gain adjustment individually on respective color information of the video signal D1 by the setting device 7, and controls the image-taking device 2, the image processor 5, and the displaying device 6.

The digital camera 1 can adjust the gain individually for respective color information of R, G, B of the video signal D1 outputted from the image-taking device 2 by using the gain adjuster 3 of the image processor 5.

Figure 2:
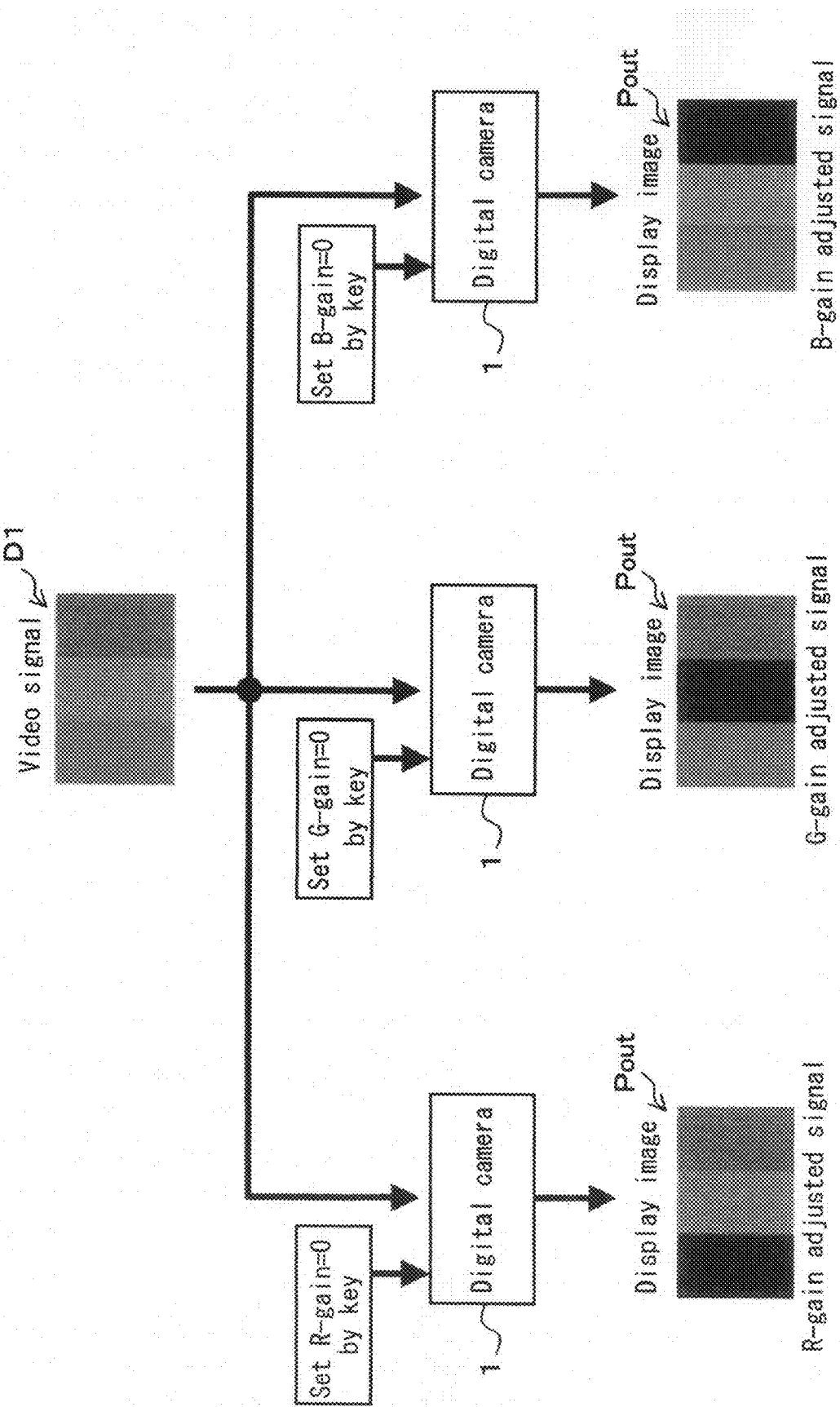
FIG. 2 is an illustration for describing the effects of the first embodiment.

FIG. 2 shows the effect of the case where respective gains of R, G, B are individually set to be 0 in the embodiment.

When the setting device 7 is set so that the R-gain becomes 0, there is obtained the adjusted video signal D2, which is the video signal D1 with a level of R-data adjusted to be 0. The image data P1 obtained by further converting the adjusted video signal D2 is outputted to the displaying device 6. Pout is the display image displayed on the displaying device 6, in which red is converted to black.

Likewise, when the setting device 7 is set so that the G-gain becomes 0, there is obtained the adjusted video signal D2, which is the video signal D1 with a level of G-data adjusted to be 0. The image data P1 obtained by further converting the adjusted video signal D2 is outputted to the displaying device 6. In the display image Pout, green is converted to black.

Similarly, when the setting device 7 is set so that the B-gain becomes 0, there is obtained the adjusted video signal D2, which is the video signal D1 with a level of B-data adjusted to be 0. The image data P1 obtained by further converting the adjusted video signal D2 is outputted to the displaying device 6. In the display image Pout, blue is converted to black.

Figure 3:
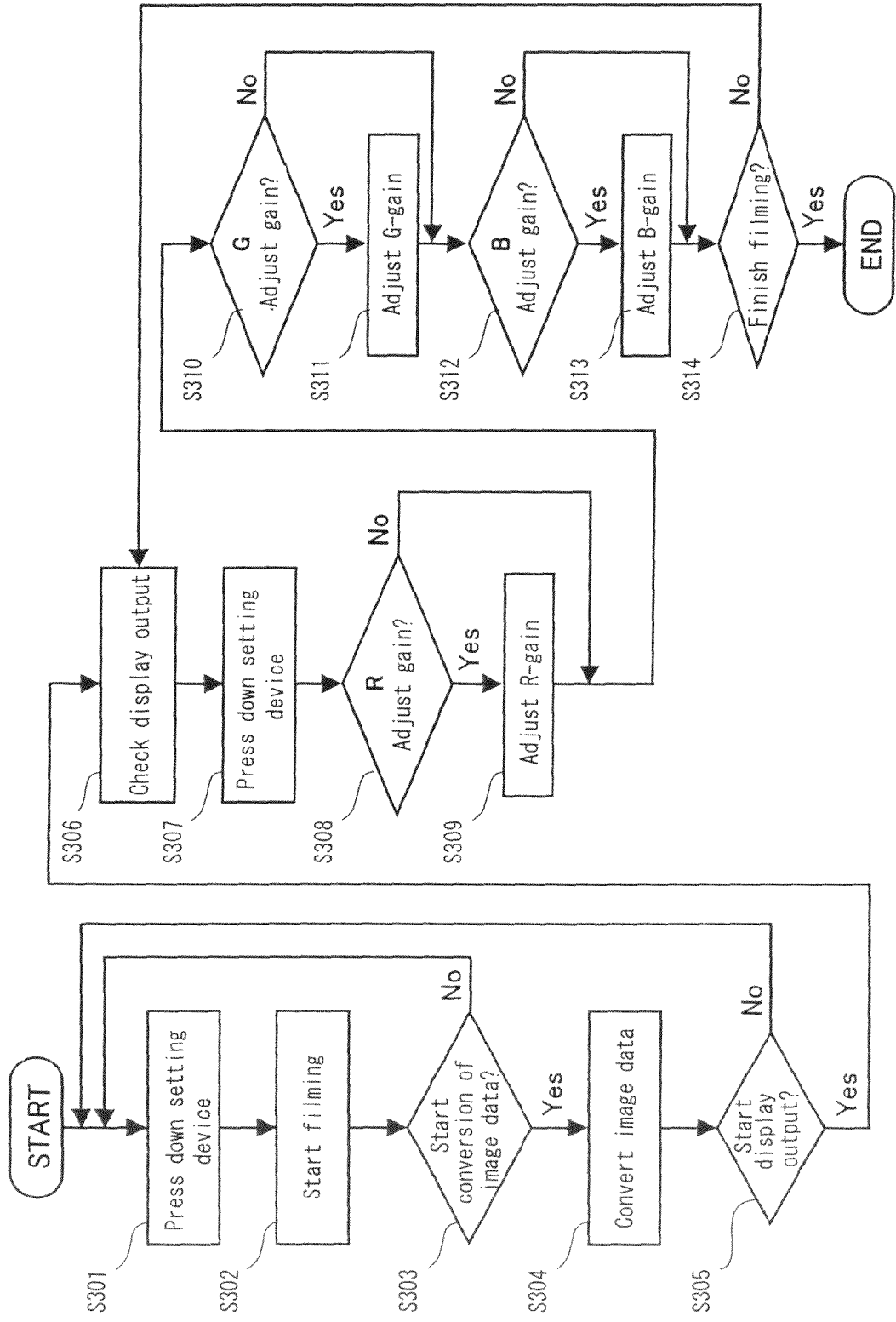
FIG. 3 is a flowchart for showing action of the digital camera according to the first embodiment.

FIG. 3 is a flowchart for showing control action of the digital camera 1 of FIG. 1. Filming is started when a switch in the setting device 7 is pressed down (step S301). The image-taking device 2 picks up light from the subject and output the video signal D1 (step S302). By converting the video signal D1 to the image data P1 using the image data converter 4 and outputting it, the image data Pout is displayed in the displaying device 6 (steps S303-S305). When a user checks the display image Pout (step S306), and further pressing down the switch in the setting device 7 (step S307), gain adjustment can be performed individually for each color information of R, G, B. That is, by setting the gain adjustment through the setting device 7, gain adjustment is performed in accordance with the set color information, and it is possible to change the setting of gain adjustment until filming is ended (steps S308-S314).

Figure 4:
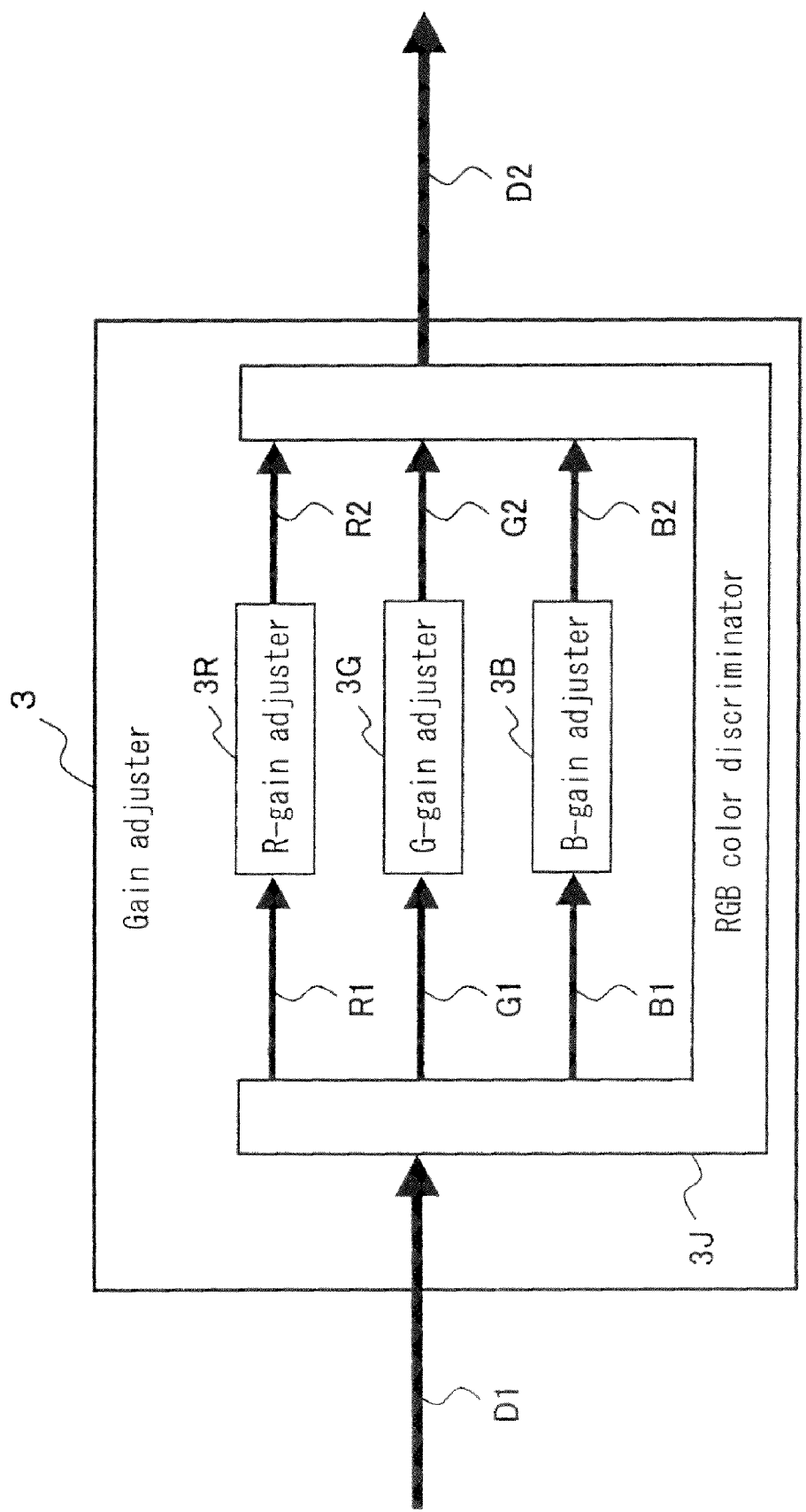
FIG. 4 is a block diagram for showing the structure of a gain adjuster according to the first embodiment.

FIG. 4 shows the structure of the gain adjuster 3 of the image processor 5. The video signal D1 outputted by the image-taking device 2 is separated into R-data R1, G-data G1, and B-data B1 by an RGB color discriminator 3J. The separated R-data R1 is gain-adjusted by an R-gain adjuster 3R and outputted as R-data R2. Likewise, the separated G-data G1 is gain-adjusted by a G-gain adjuster 3G and outputted as G-data G2. The B-data B1 is gain-adjusted by a B-gain adjuster 3B and outputted as B-data B2. Further, the R-data R2, the G-data G2, and the B-data B2 are coupled in a time series by the RGB color discriminator 3J, and outputted to the image data converter 4 as the adjusted video signal D2.

Figure 6:
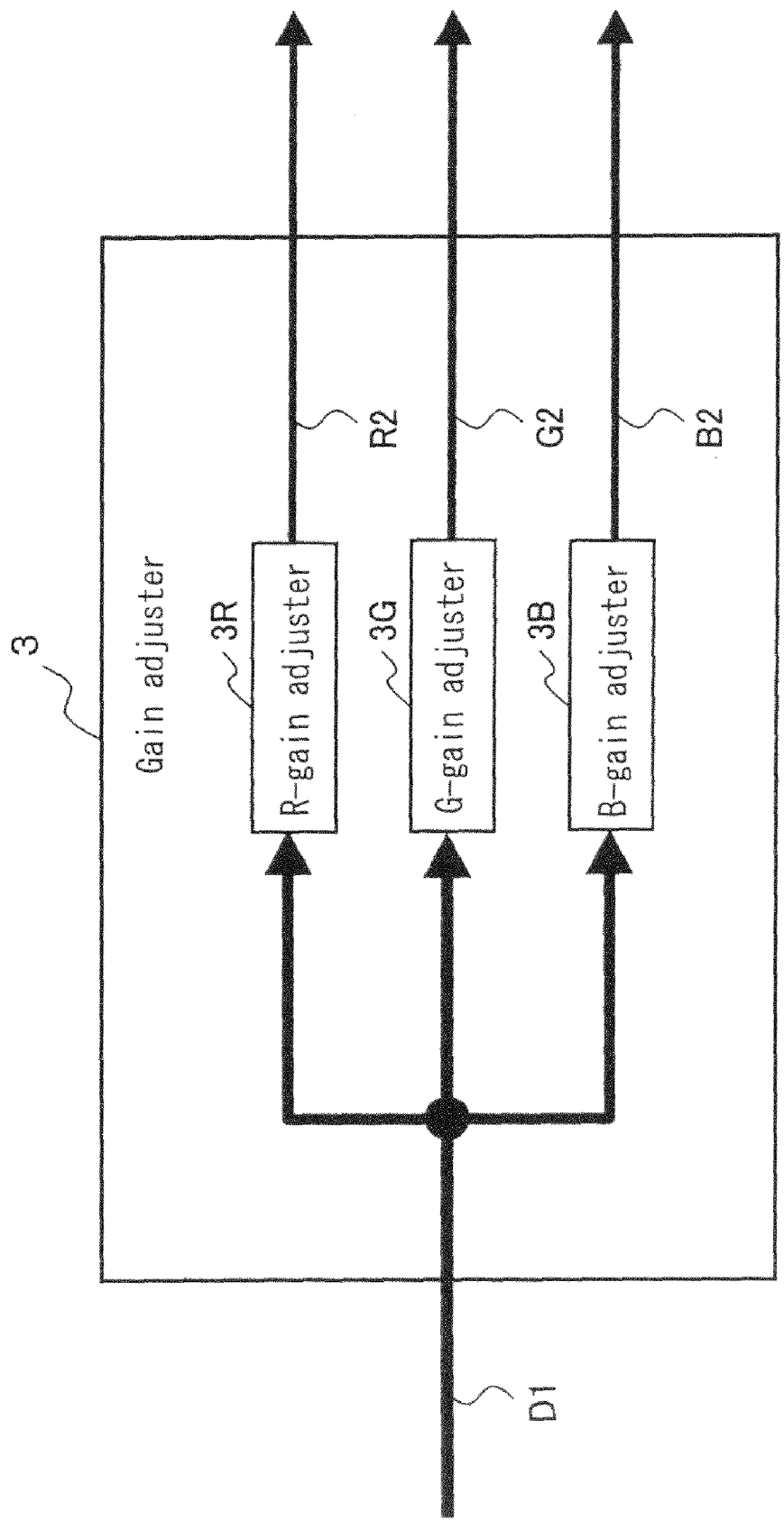
FIG. 6 is a block diagram for showing the structure of a gain adjuster shown in FIG. 5.

The structure of the image processor 5 is not limited to the one shown in FIG. 4. As shown in FIG. 5, the RGB color discriminator 3J may be provided to the image data converter 4. FIG. 6 shows the gain adjuster 3 of FIG. 5. The gain adjuster 3 shown in FIG. 6 uniformly adjusts the R-gain adjusting value by the R-gain adjuster 3, the G-gain adjusting value by the G-gain adjuster 3G, and the B-gain adjusting value by the B-gain adjuster 3B, respectively, without considering which is the R-data, G-data, or B-data among the inputted video signal D1. The complementary-color data can be expressed as Ye=R+G, Cy=B+G, Mg=R+B,G, for example. Thus, when separating a primary color from a complementary color, two pieces of data, i.e. R-data and G-data, can be generated simultaneously from a single piece of Ye data. Because of this, the gain adjuster of FIG. 6 outputs, in parallel, the data of each color (R-data R2, G-data G2, B-data B2) to the image data converter 4 by each color. For the data of each color after the gain adjustment, effective part of each color is sampled by the RGB color discriminator 3J of the image data converter 4. The image data converter 4 converts the sampled and gain-adjusted adjusted video signal D2 and outputs the image data P1.

It is possible with the embodiment to adjust the gain of respective color information of R, G, B individually. Therefore, the color-vision nonhandicapped can understand how it looks to the color-vision handicapped of various degrees.

Second Embodiment

A second embodiment of the present invention has a different color filter for the image sensor element, which corresponds to the case where the image sensor element is provided with a color filter with complementary colors Cy (cyan: blue), Mg (magenta: reddish purple), Ye (yellow).

Figure 7:
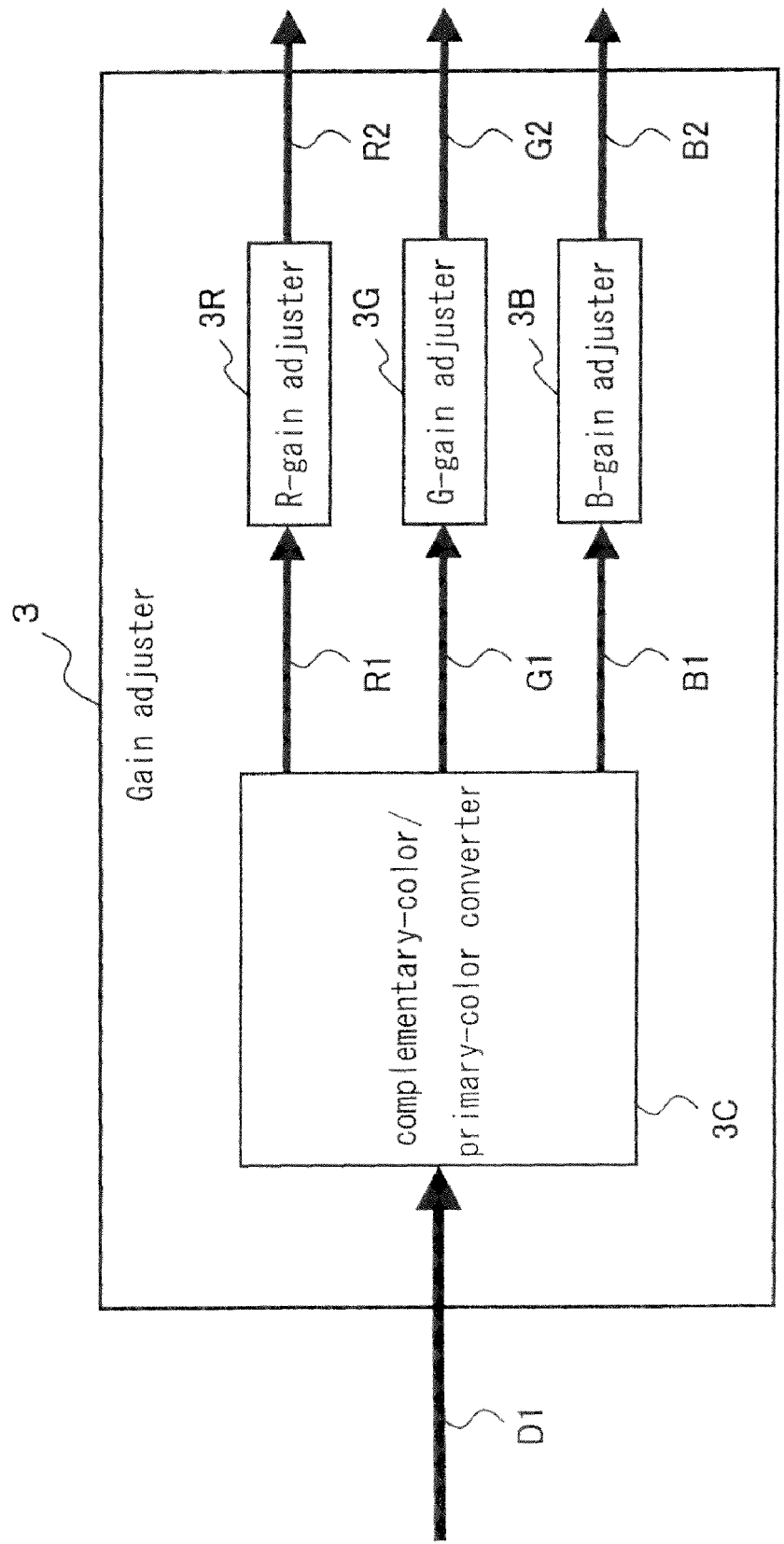
FIG. 7 is a block diagram for showing the structure of a gain adjuster in a digital camera according to a second embodiment of the present invention.

FIG. 7 is a block diagram for showing the structure of the gain adjuster 3 compatible with the complementary colors. The gain adjuster 3 of FIG. 7 converts and separates the data of complementary colors Ye, Cy, Mg, G outputted from the image-taking device 2 into the R-data R1, G-data G1, B-data B1, which correspond to the video signal with R, G, B in the case of the first embodiment, by using a complementary-color/primary-color converter 3C. The processing after separation is the same as that of the first embodiment where the image-taking device 2 comprises the primary-color filter.

In the embodiment, even when the image-taking device 2 comprises the complementary-color filter, the data of complementary colors Ye, Cy, Mg, and G is converted to the R, G, B-based data by the complementary-color/primary-color converter 3C, and then respective color information is gain-adjusted individually. Thus, the color-vision nonhandicapped can understand how it looks to the color-vision handicapped of various degrees. That is, it is possible to deal easily with the difference in the color filter of the image taking device.

Third Embodiment

A third embodiment of the present invention makes it possible for the color-vision nonhandicapped to understand how it looks to the color-vision handicapped in accordance with the degrees of impairment.

Figure 8:
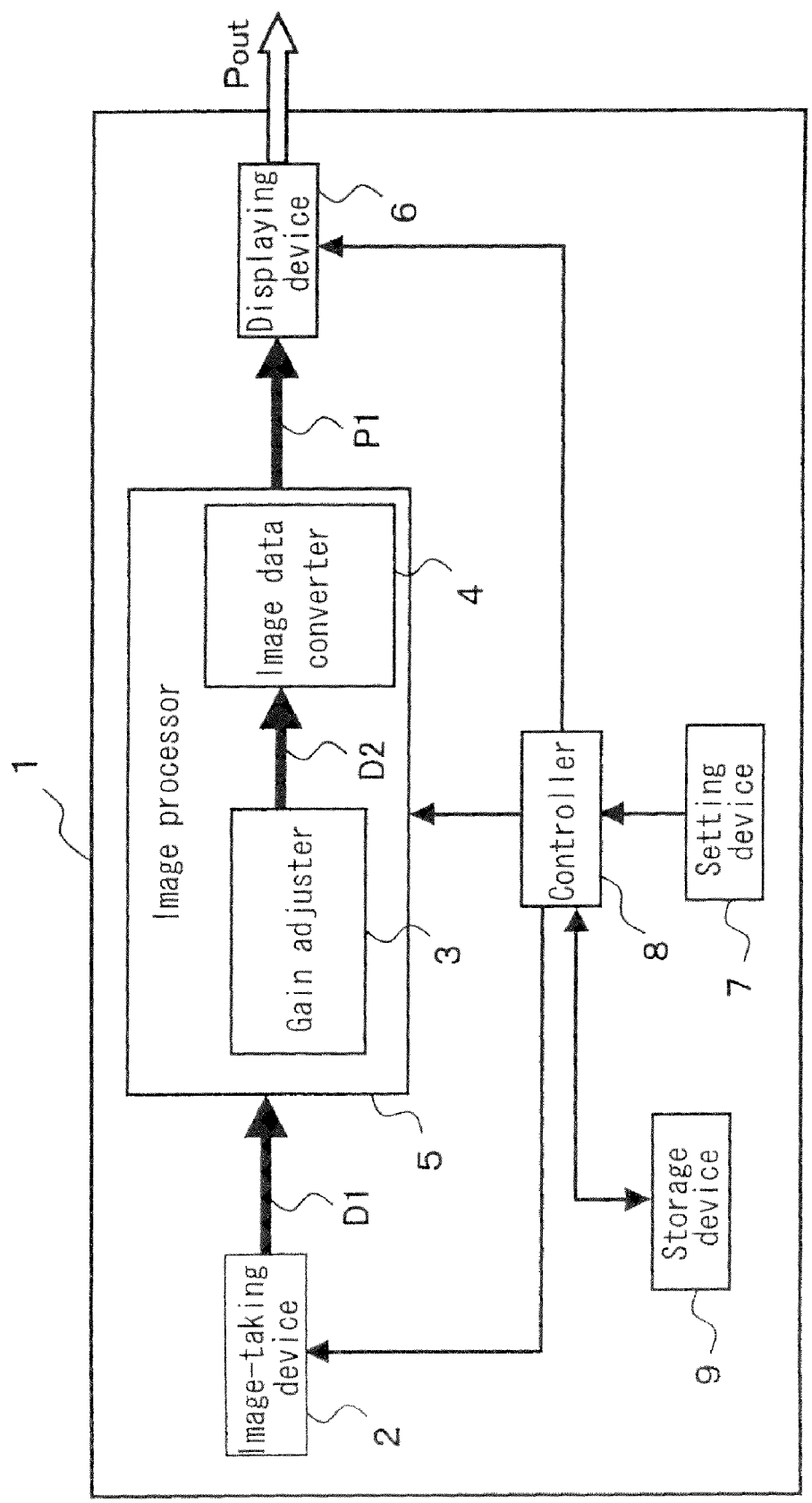
FIG. 8 is a block diagram for showing the structure of a digital camera according to a third embodiment of the present invention.

FIG. 8 is a block diagram for showing the structure of the digital camera 1 according to the third embodiment of the present invention. The embodiment is provided with a storage device 9 for storing gain adjusting values for each color in accordance with the degrees of color-vision impairment such as a first color-vision impairment, a second color-vision impairment, and a third color-vision impairment. The first color-vision impairment corresponds to the case where the red cone of an eyeball does not function, the second color-vision impairment corresponds to the case where the green cone of an eyeball does not function, and the third color-vision impairment corresponds to the case where the blue cone of an eyeball does not function.

The storage device 9 stores: a first color-vision gain adjusting value that achieves gain adjustment for providing the color information of the first color-vision impairment; a second color-vision gain adjusting value that achieves gain adjustment for providing the color information of the second color-vision impairment; and a third color-vision gain adjusting value that achieves gain adjustment for providing the color information of the third color-vision impairment. The controller 8 searches the storage device 9 in accordance with the degrees of the color-vision impairment set by the setting device 7, and extracts the gain adjusting values for respective color information according to the degrees of the color-vision impairment.

Figure 9:
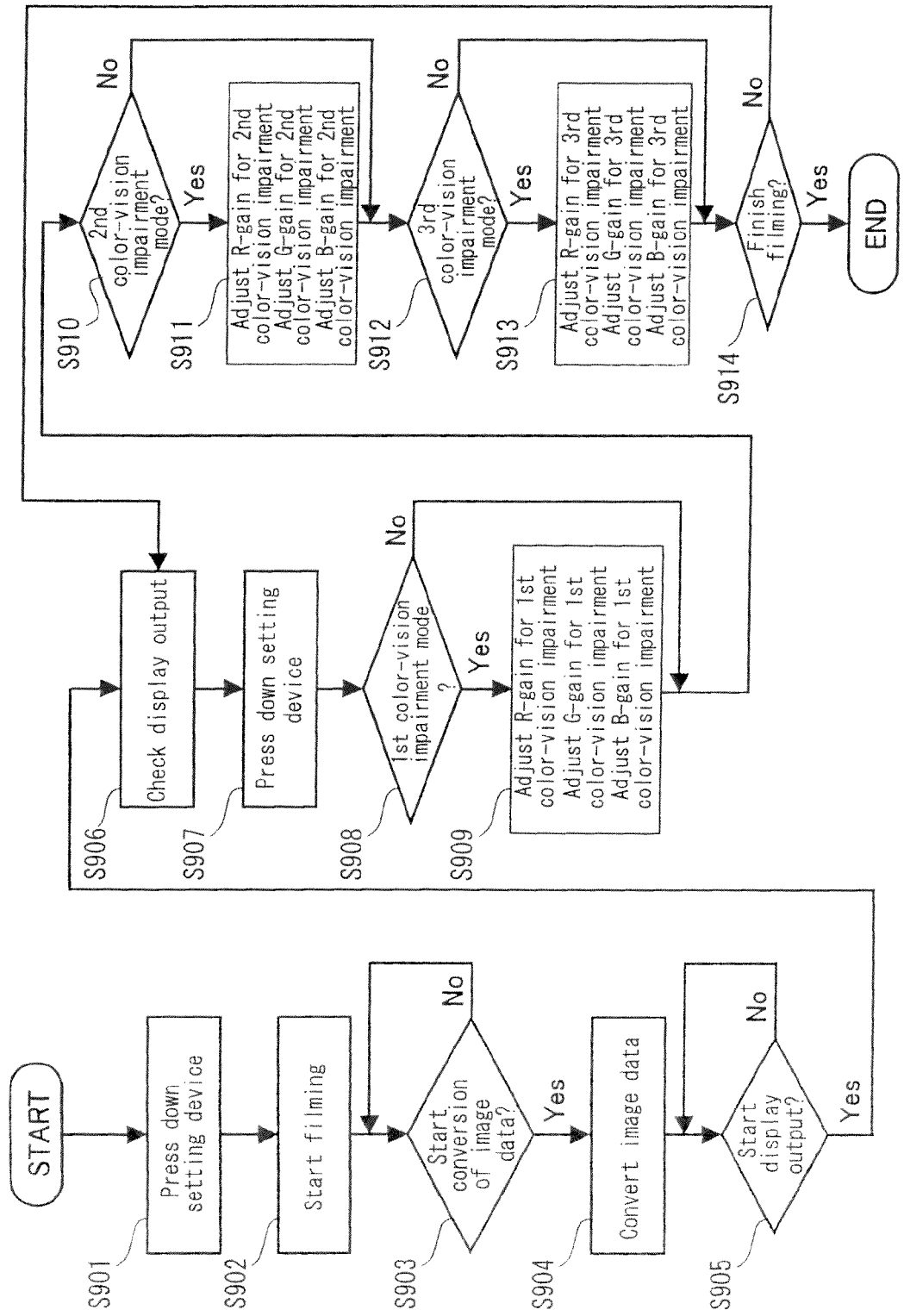
FIG. 9 is a flowchart for showing action of the digital camera according to the third embodiment.

FIG. 9 is a flowchart for showing the action when controlling the digital camera 1 of FIG. 8. After starting filming and display processing (steps S901-S906), the gain adjusting value for the color-vision impairment selected by pressing down the switch of the setting device 7 (step S907) is read out from the storage device 9. Based on the read-out gain adjusting value, there is performed the first color-vision gain adjustment when the read-out value is of the first color-vision impairment, the second color-vision gain adjustment when it is of the second color-vision impairment, and the third color-vision gain adjustment when it is of the third color-vision impairment (steps S908-S914). With this structure, it is possible for the color-vision nonhandicapped to understand how it looks to the color-vision handicapped of each color.

Figure 10:
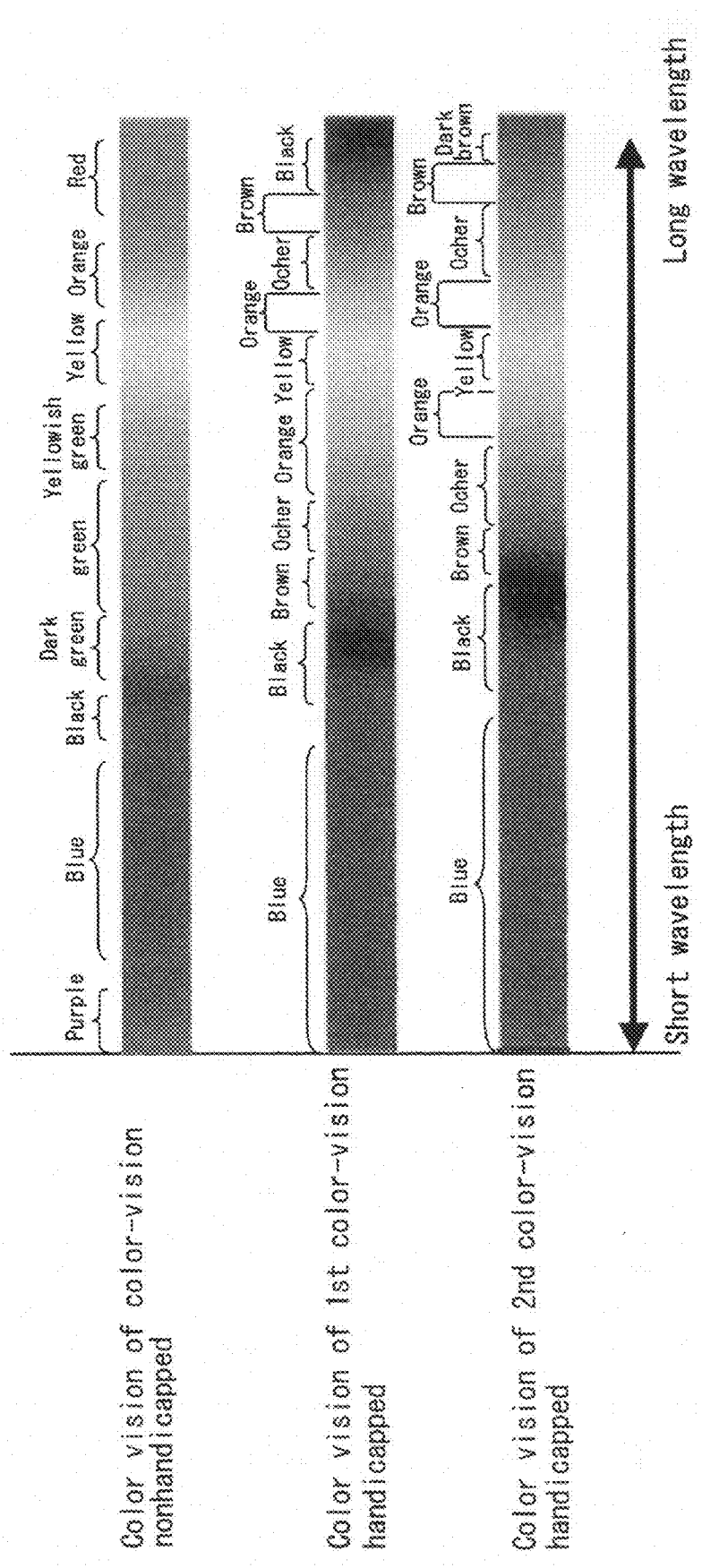
FIG. 10 is an illustration for describing color vision of a color-vision nonhandicapped, color vision of a first color-vision handicapped, and color vision of a second color-vision handicapped according to the third embodiment.

FIG. 10 shows color visions of the color-vision nonhandicapped, color visions of the first color-vision handicapped, and color visions of the second color-vision handicapped. FIG. 10 corresponds to each color from short wavelengths to long wavelengths. FIG. 11 shows how the light of R, G, B from the subject look to the color-vision nonhandicapped, the first color-vision handicapped, and the second color-vision handicapped, respectively.

It can be seen that the color-vision handicapped of each color cannot properly recognize colors of red and green because a part of the cone does not function. In other words, for the first color-vision handicapped, red turns reddish brown, and green turns dark orange. For the second color-vision handicapped, red turns dark orange, and green turns brown. The color visions shown in FIG. 11 are only recognized by individuals and cannot be shared with others.

With the digital camera 1 of the embodiment, as shown in FIG. 12A-FIG. 12C, it is possible to perform gain adjustment in accordance with the color-vision impairment of each color. When the gain adjusting value of the color-vision nonhandicapped is set in the setting device 7, the gain adjusting value of the color-vision nonhandicapped is read out from the storage device 9 to be transmitted to the gain adjuster 3 of the image processor 5. As a result, there is obtained the display image Pout that is not gain-adjusted. Further, when the gain adjusting value of the first color-vision impairment is set in the setting device 7, the gain adjusting value corresponding to the first color-vision impairment is read out from the storage device 9 to be transmitted to the gain adjuster 3 of the image processor 5. As a result, there is obtained the display image Pout to which gain adjustment corresponding to the first color-vision impairment is performed. Furthermore, when the gain adjusting value of the second color-vision impairment is set in the setting device 7, the gain adjusting value corresponding to the second color-vision impairment is read out from the storage device 9 to be transmitted to the gain adjuster 3 of the image processor 5. As a result, there is obtained the display image Pout to which gain adjustment corresponding to the second color-vision impairment is performed. With this, it is possible for the color-vision nonhandicapped to understand how it looks to the color-vision handicapped of each color.

Fourth Embodiment

Figure 13:
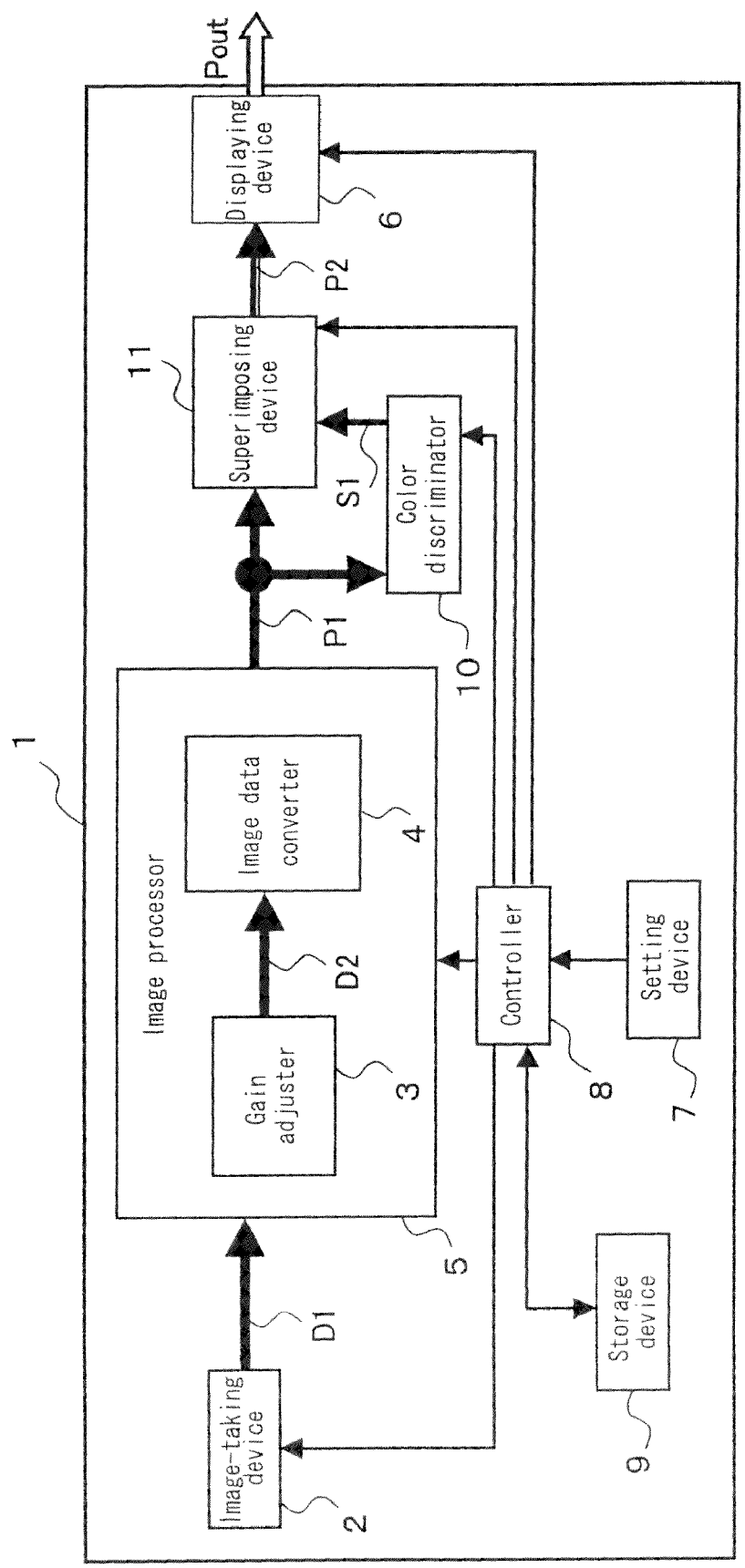
FIG. 13 is a block diagram for showing the structure of a digital camera according to a fourth embodiment of the present invention.

A fourth embodiment of the present invention enables easy recognition of color boundaries. FIG. 13 is a block diagram for showing the structure of the digital camera 1 according to the fourth embodiment of the present invention. The digital camera 1 of the embodiment comprises a color discriminator 10 for identifying the boundary between the color regions that are adjacent to each other in an image area within the image data P1. The color region herein means an area that partially occupies image plane of the image data, which is characterized as having almost the same color information but the different color information from that of the surrounding part. Furthermore, the digital camera 1 comprises an superimposing device 11 that generates superimposing data S1, which is obtained by changing the luminance of the boundary between the color regions of the image data P1 using color boundary information attained from the color discriminator 10, and superimposes the generated superimposing data S1 on the image data P1. Image data P2 on which the superimposing data is superimposed is transmitted to the displaying device 6. Other structures are the same as those of the first embodiment (FIG. 1), so that the same reference numerals are simply applied and the description thereof is omitted.

In this embodiment, as shown in FIG. 14A-FIG. 14C, there is performed processing for strengthening or weakening the luminance at the boundary between the color regions where the color changes, with respect to the luminance of the color regions positioned in the surrounding thereof. Thereby, a difference in the luminance is provided between the boundary and the color regions in the surrounding thereof. Specifically, the boundary may be of a thick black line or of a thick white line. With this, it becomes easier for the color-vision handicapped and for the color-vision nonhandicapped to recognize the color boundaries in the display of color-vision impairment.

Fifth Embodiment

A fifth embodiment of the present invention enables easy recognition of color boundaries. The structure is the same as that of the fourth embodiment (see FIG. 13).

The superimposing device 11 generates the superimposing data, which is obtained by changing at least either hue or saturation of the boundary in the image data P1 using the boundary information of the color regions attained from the color discriminator 10, and superimposes the generated superimposing data S1 on the image data P1.

In this embodiment, as shown in FIG. 15A-FIG. 15C, the boundary between the color regions is expressed by superimposing the color information of the nonadjacent color, which is recognizable, on the boundary positioned between the regions of colors that have different color information. With this, it becomes easier for the color-vision handicapped and for the color-vision nonhandicapped to recognize the boundary between the color regions of color-vision impairment.

Sixth Embodiment

A sixth embodiment of the present invention performs boundary highlighting when the boundary between the color regions of the color-vision impairment becomes unclear as a result of gain adjustment.

FIG. 16A-FIG. 16C are for describing that the color-vision handicapped identify as being the same colors even if the light from the subject contains information of different colors. In FIG. 16A-FIG. 16C, the color information of the light from the subject and the display image Pout of the digital camera 1 are made corresponded. For the color information of the light from the subject, the color region in the center is green, the color region on the left is dark orange, and the color region on the right is blue in all of the drawings FIG. 16A-FIG. 16C.

FIG. 16A is the case where a mode for the color-vision nonhandicapped is set in the setting device 7. In the display image Pout, the color region in the center is green, the left is dark orange, and the right is blue, which is the same as the color information of the light from the subject FIG. 16B is the case where a mode for the first color-vision impairment is set in the setting device 7. The color region in the center (green) is gain-adjusted based on the setting. In the display image Pout, the color region in the center changes form green to dark orange, the color region on the left is dark orange, and the color region on the right is blue. It is understood from this that the first color-vision handicapped cannot identify the boundary between the color region of green and that of dark orange in the color information from the subject.

FIG. 16C is the case where a mode for the second color-vision impairment is set in the setting device 7. The color region in the center (green) is gain-adjusted based on the setting. In the display image Pout, the color region in the center changes form green to brown. The color region on the left is dark orange, and the color region on the right is blue, which are the same as the original. Although the boundary between the color region of brown and that of dark orange is unclear, the boundary can be better identified compared to the case shown in FIG. 16B.

Figure 17:
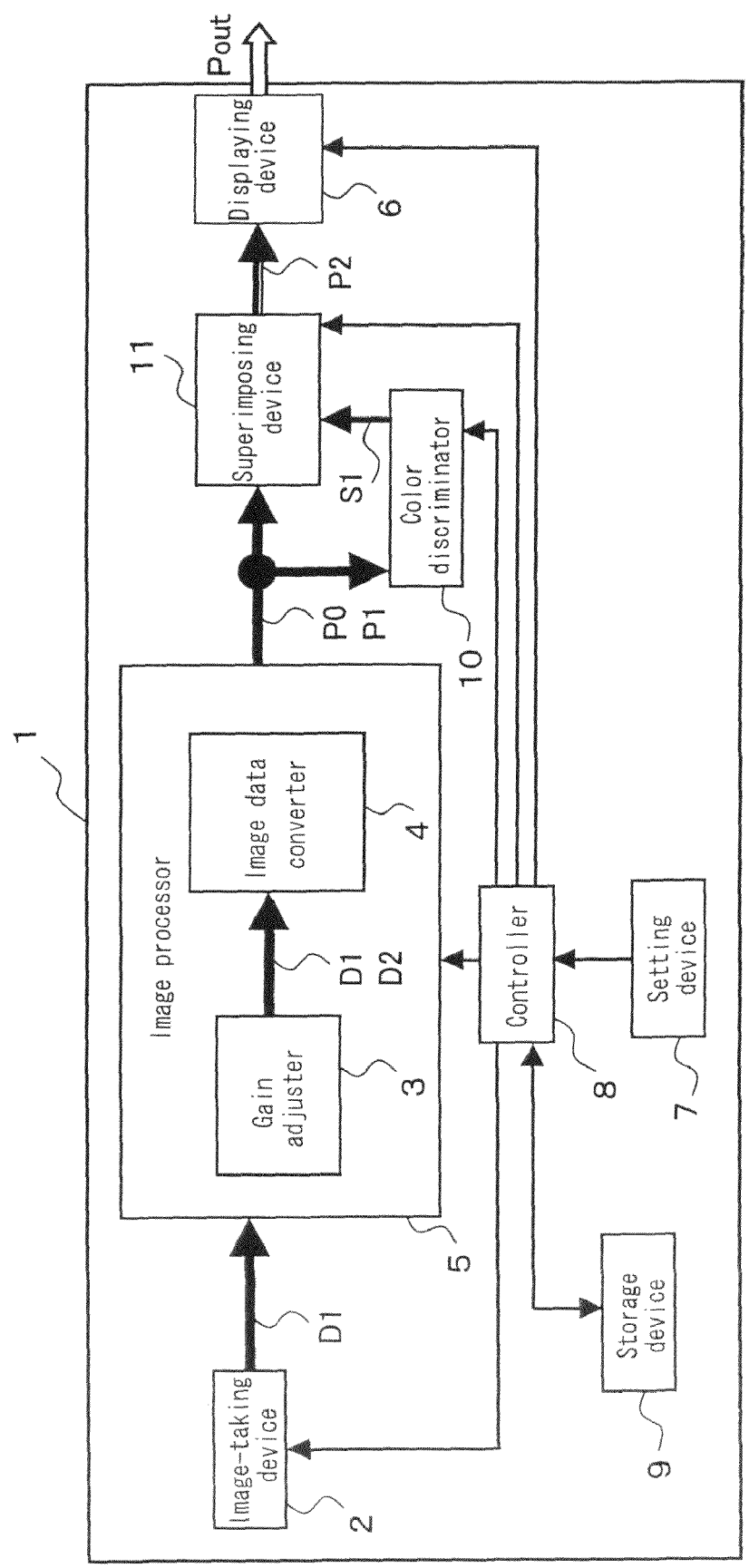
FIG. 17 is a block diagram for showing the structure of a digital camera according to the sixth embodiment of the present invention.
Figure 18:
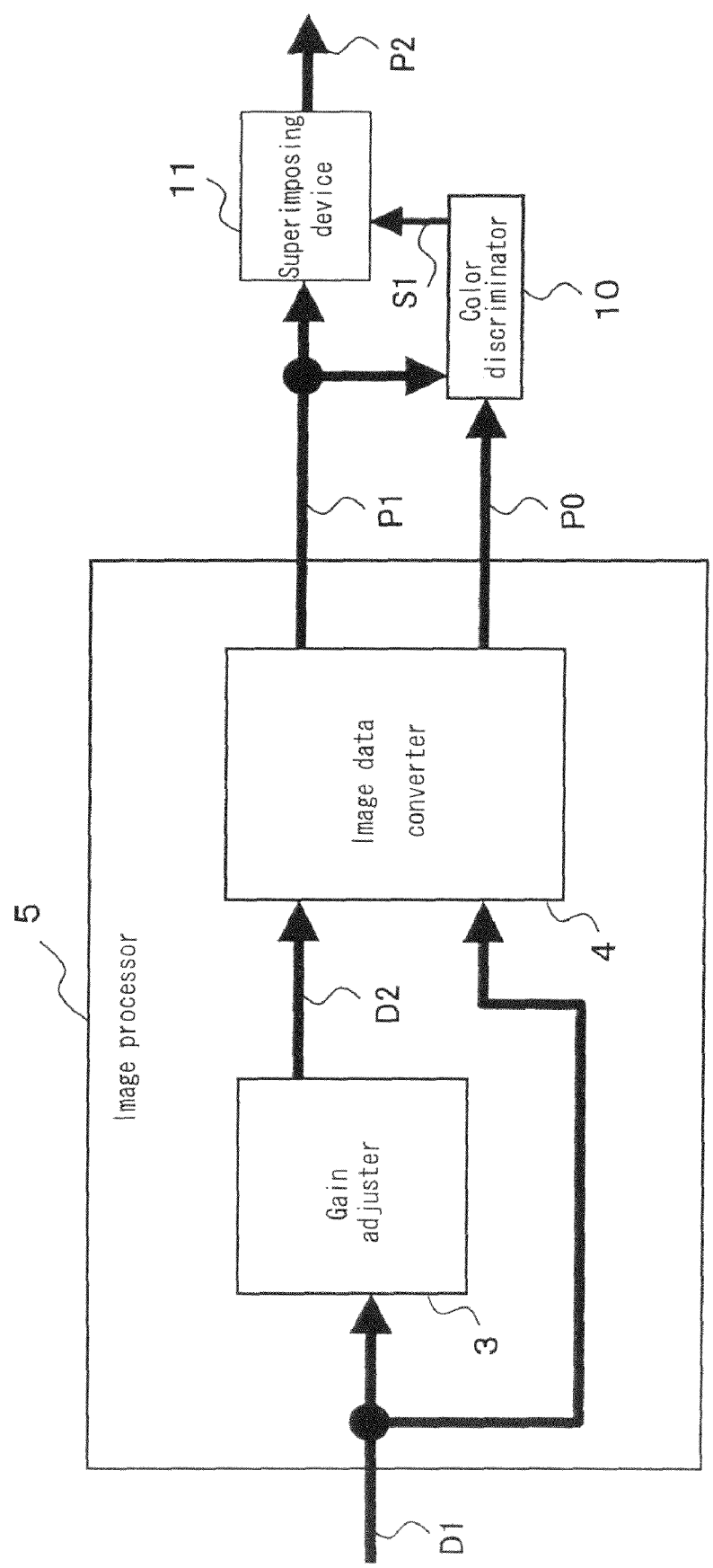
FIG. 18 is a block diagram for showing the structure of an image processor according to the sixth embodiment.

FIG. 17 is a block diagram for showing the structure of the digital camera 1 according to the sixth embodiment. FIG. 18 shows the details of the image processor 5 shown in FIG. 17.

The image data converter 4 of the image processor 5 converts the video signal D1 with no gain adjustment into image data P0 and converts the adjusted video signal D2 that is gain-adjusted by the gain adjuster 3 into image data P1. The color discriminator 10 divides the image area of the image data P0 obtained by converting the video signal D1 into each color region on a plane, and samples the color information of each divided color region. Furthermore, the color discriminator 10 divides the image area of the image data P1 obtained by converting the adjusted video signal D2 into each color region on a plane, and samples the color information of each divided color region. Moreover, the color discriminator 10 discriminates the difference between color information of the image data P0 and that of the image data P1 and transmits the result of the discrimination to the superimposing device 11.

Based on the result of the discrimination supplied form the color discriminator 10, the superimposing device 11 generates the superimposing data S1 exclusively for the color region that satisfies the following condition and superimposes it on the image data that is obtained by converting the adjusted video signal.

In the image data P0, the color information of the color regions adjacent to each other (referred to as adjacent color regions hereinafter) is different.

In the image data P1, hues of the adjacent color regions are the same.

As shown in FIG. 16B, even in the color region where the color-vision handicapped identify as being the same colors although the color information of the light from the subject contains information of different colors, it is possible to discriminate the color regions by using the digital camera 1 of the embodiment.

FIG. 19 shows the effects of the embodiment. As shown in FIG. 19A, by setting the mode corresponding to the first color-vision impairment in the setting device 7, the color region (green) positioned in the center of the light from the subject is gain-adjusted. As a result, it turns the same color as the color region (dark orange) adjacent to that color region. However, as shown in FIG. 19B, by setting a change of luminance of the boundary between the same colors in the setting device 7, it is possible to provide a difference of the luminance between both regions even though the regions are in the same color. Thereby, the first color-vision handicapped and the color-vision nonhandicapped can correctly discriminate the boundary of the color regions of the first color-vision impairment.

Seventh Embodiment

A seventh embodiment of the present invention, when the boundary between the different color regions becomes unclear as a result of the gain adjustment, easily recognizes that the color region whose color is changed due to the gain adjustment has turned the same color as that of the surrounding color regions.

Figure 20:
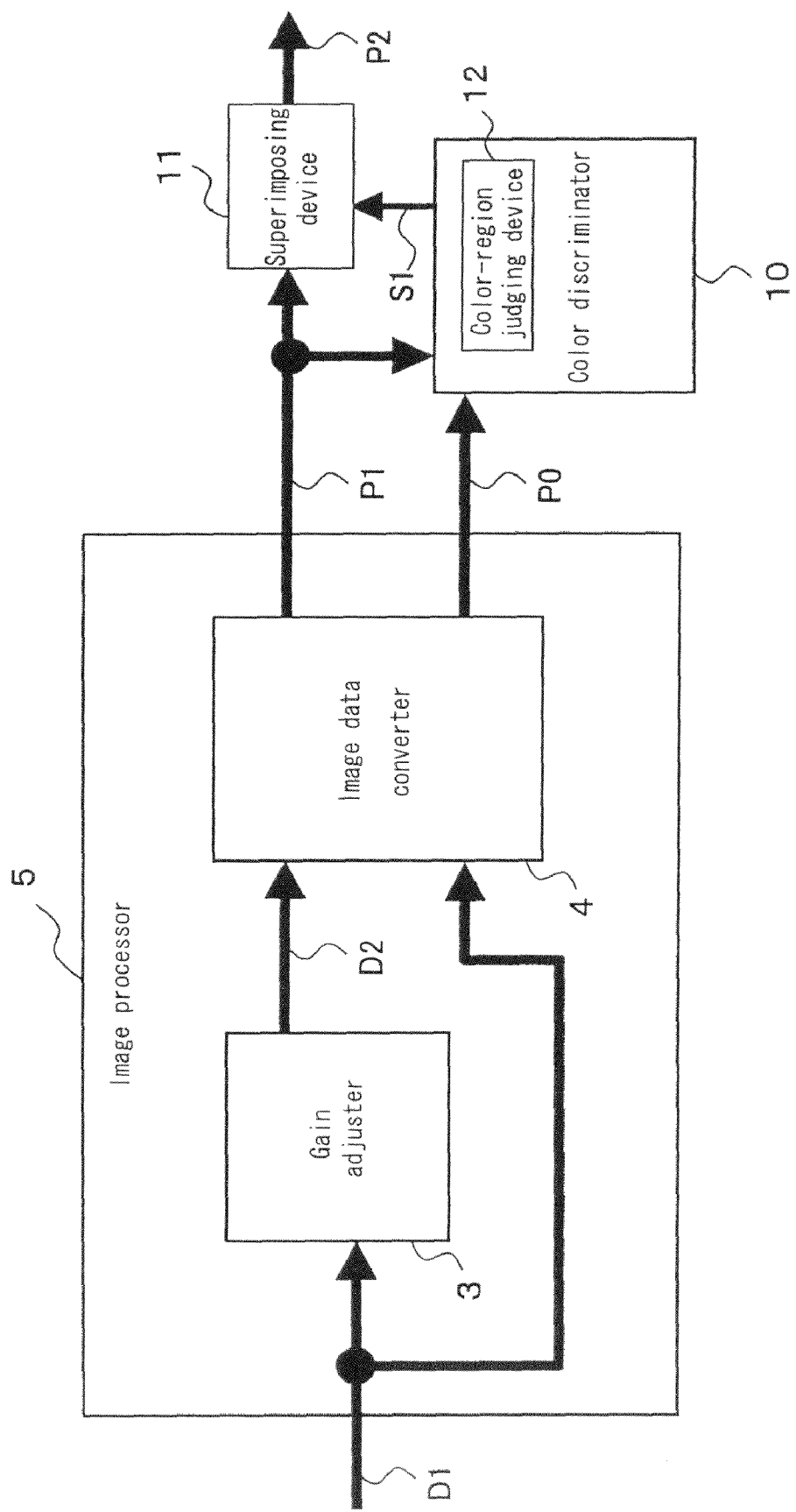
FIG. 20 is a block diagram for showing the structure of a digital camera according to a seventh embodiment of the present invention.

FIG. 20 is a block diagram for showing the structure of the digital camera 1 according to the seventh embodiment of the present invention. In the digital camera 1 of the embodiment, in addition to the structure (FIG. 17) of the sixth embodiment, the color discriminator 10 is further provided with a color region judging device 12 which discriminates each color region in the image data, and then judges, from the color information, whether or not there is a pair of adjacent regions which are adjacent and have the same color information with each other. For the pair of adjacent color regions of same color discriminated by the color region judging device 12, the superimposing device 11 generates the superimposing data S1, which is obtained by changing at lest one of the luminance, hue, saturation of the image data P1, and superimposes the superimposing data S1 on the image data P1. The basis for judging the pair of adjacent color regions of same color is the same as that of the sixth embodiment, so that the description thereof will be omitted.

Figure 21B:
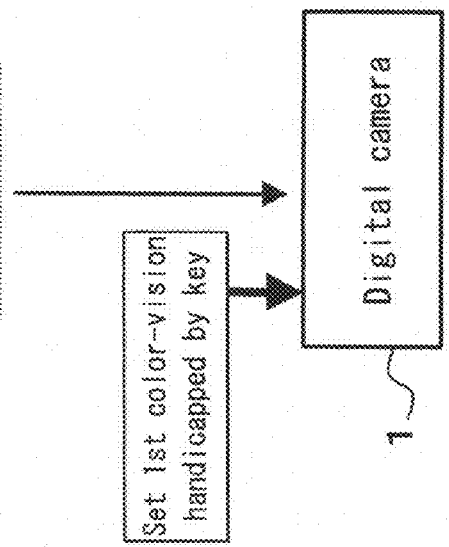
FIG. 21A-21B are illustrations for describing action of the digital camera according to the seventh embodiment.
Figure 21A:
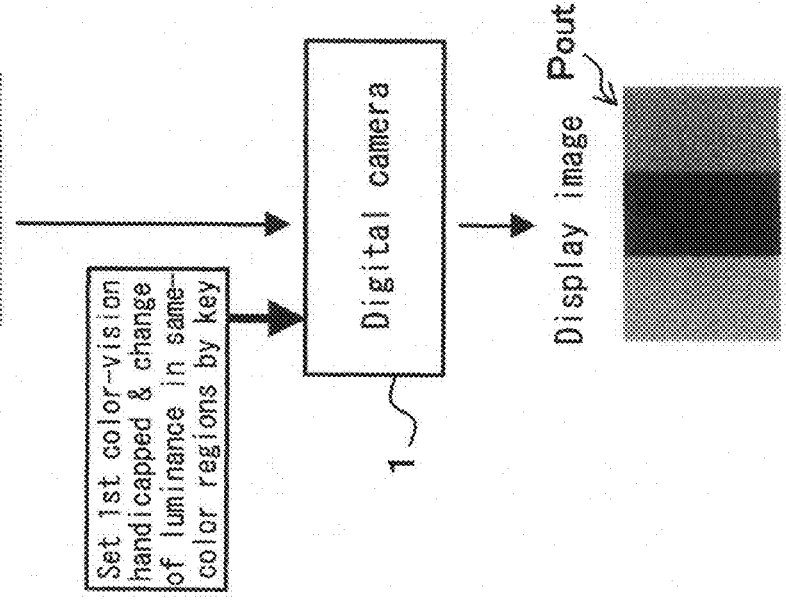

FIG. 21A and FIG. 21B show the effects of the embodiment. As shown in FIG. 21A, when the mode corresponding to the first color-vision impairment is set in the setting device 7, the color region (green) in the center of the light from the subject is gain-adjusted. As a result, it turns the same color as the adjacent color region (dark orange). Thus, as shown in FIG. 21B, one of the luminance, hue, saturation is changed in either one of the same color regions by the setting device 7. Thereby, the above-described superimposing is performed on the pair of the color regions of same color. In FIG. 21, by way of example, the luminance is adjusted for changing the center region to black. With this, it is possible to prevent the pair of adjacent color regions of different colors from turning the same color due to the gain adjustment (see FIG. 21A).

Eighth Embodiment

An eighth embodiment of the present invention highlights the boundary between the color regions by non-stored colors (colors that are not in the image data obtained by converting the adjusted video signal).

The digital camera 1 of the embodiment is the same as that of the sixth embodiment shown in FIG. 17 except that the storage device 9 further has a function of storing the color information of the image data P1 that is obtained by converting the adjusted video signal D2. Furthermore, the superimposing device 11 generates the superimposing data S1 in which the non-stored colors (colors not stored in the storage device 9) are used, and superimposes the generated superimposing data S1 on the image data P1.

FIG. 22A-FIG. 22C show the effects of the embodiment. In all the cases of FIG. 22A-FIG. 22C, the color information of the light from the subject has the green color region in the center, the red color region on the left, and blue color region on the right.

FIG. 22A shows the state where the mode for the color-vision nonhandicapped as well as hue change in the boundary between the color regions are set in the setting device 7. The display image Pout is the same as the color information, which has the green color region in the center, the red color region on the left, and blue color region on the right. Furthermore, the boundary between each color region is colored in the non-stored color that is not stored in the storage device 9.

FIG. 22B shows the state where the mode for the first color-vision impairment as well as hue change in the boundary between the color regions are set in the setting device 7. Due to the gain adjustment based on the mode, in the display image Pout, the color region in the center is changed from green to dark orange, the color region on the left is changed from red to reddish brown, and color region on the right stays blue. Furthermore, the boundaries between each color region are colored in the non-stored color that is not stored in the storage device 9.

FIG. 22C shows the state where the mode for the second color-vision impairment as well as hue change in the boundary between the color regions are set in the setting device 7. Due to the gain adjustment according to the mode, in the display image Pout, the color region in the center is changed from green to brown, the color region on the left is changed from red to dark orange, and color region on the right stays blue. Furthermore, the boundary between each color region is colored in the non-stored color that is not stored in the storage device 9.

On the boundaries between all the color regions including the color regions whose colors change as described above, there is superimposed the superimposing data S1 of non-stored color, i.e. the color that is not in the image data P1 obtained by converting the adjusted video signal D2. Thereby, the boundary between the color regions can be expressed by a recognizable color, so that a change of color can be easily recognized.

Ninth Embodiment

A ninth embodiment of the present invention highlights the boundary between the color regions by unexpressed colors (colors of image data that cannot be obtained by converting the video signal based on the gain adjusting value in the storage device).

The digital camera 1 of the embodiment is the same as that of the sixth embodiment shown in FIG. 17 except that the storage device 9 further has a function of storing the unexpressed color showing the color of the image data P1 that cannot be obtained by converting the video signal D1 based on the gain adjusting value in the storage device 9. Furthermore, the superimposing device 11 generates the superimposing data S1 in which the unexpressed color is used, and superimposes it on the image data P1. The unexpressed color is determined in advance and the gain adjusted value is determined based thereon such that the unexpressed color cannot be obtained form the video signal D1.

Figure 23C:
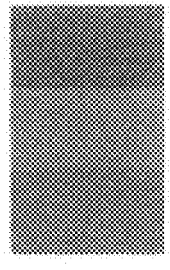
FIG. 23A-23C are illustrations for describing action of a digital camera according to a ninth embodiment of the present invention.
Figure 23B:
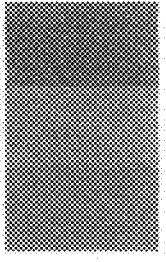
Figure 23A:
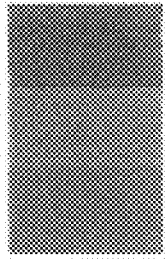

FIG. 23A-FIG. 23C show the effects of the embodiment. In all the cases of FIG. 22A-FIG. 22C, the color information of the light from the subject has the green color region in the center, the red color region on the left, and blue color region on the right.

FIG. 22A shows the state where the mode for the color-vision nonhandicapped as well as hue change in the boundary between the color regions are set in the setting device 7. The display image Pout is the same as the color information, which has the green color region in the center, the red color region on the left, and blue color region on the right. Furthermore, the boundary between each color region is colored in the unexpressed color (the color not included in the colors obtained from the video signal D1), which is stored in the storage device 9.

FIG. 23B shows the state where the mode for the first color-vision impairment as well as hue change in the boundary between the color regions are set in the setting device 7. Due to the gain adjustment base on the more, in the display image Pout, the color region in the center is changed from green to dark orange, the color region on the left is changed from red to reddish brown, and color region on the right stays blue. Furthermore, the boundary between each color region is colored in the unexpressed color that is stored in the storage device 9.

FIG. 23C shows the state where the mode for the second color-vision impairment as well as hue change in the boundary between the color regions are set in the setting device 7. Due to the gain adjustment according to the mode, in the display image Pout, the color region in the center is changed from green to brown, the color region on the left is changed from red to dark orange, and color region on the right stays blue. Furthermore, the boundary between each color region is colored in the unexpressed color that is stored in the storage device 9.

On the boundaries between all the color regions including the color regions whose colors change as described above, there is superimposed the superimposing data S1 of unexpressed color for expressing the boundaries between the color regions. This allows the color-vision handicapped as well as the color-vision nonhandicapped to recognize the boundaries between the color regions easily.

Tenth Embodiment

Figure 24:
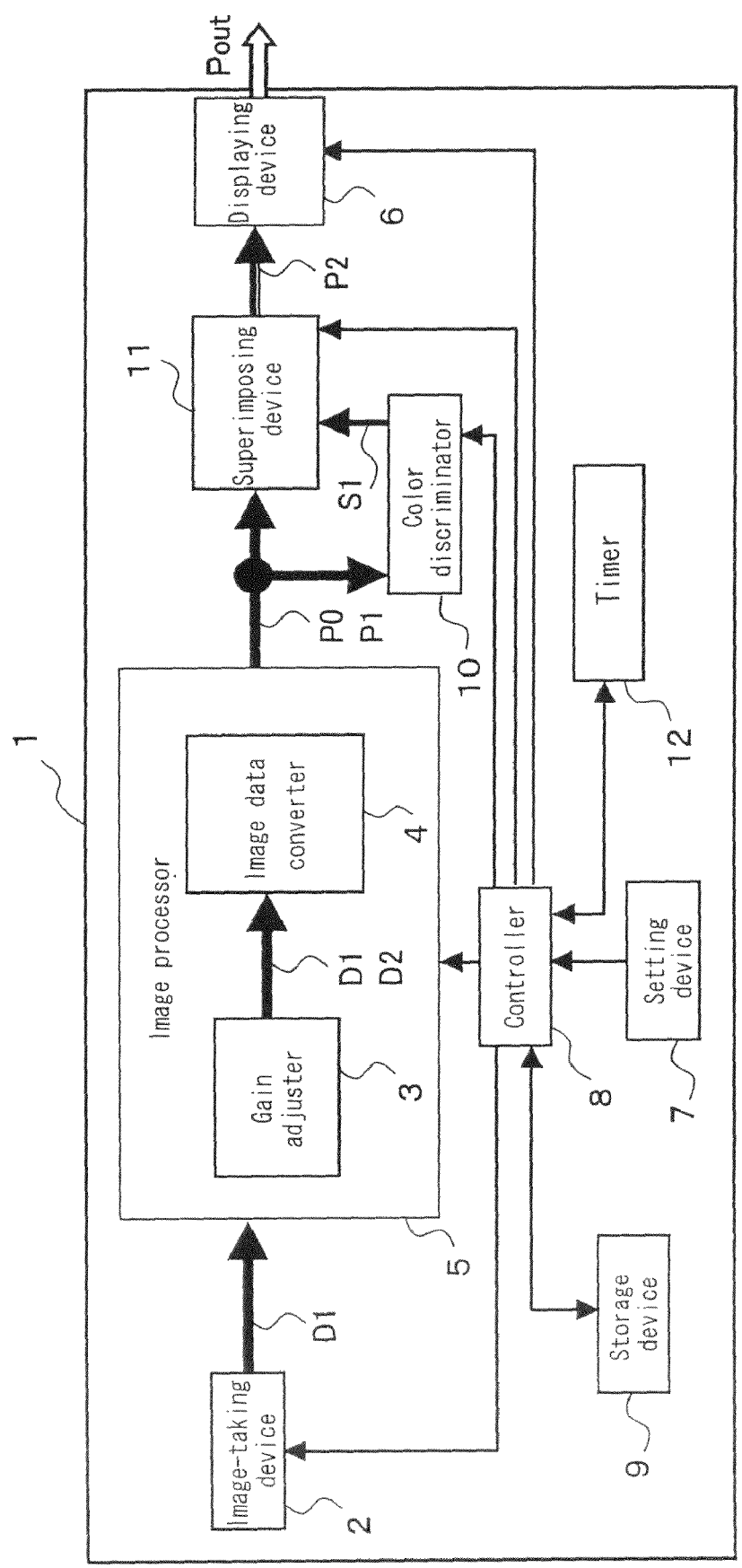
FIG. 24 is a block diagram for showing the structure of a digital camera according to a tenth embodiment of the present invention.

FIG. 24 is a block diagram for showing the structure of the digital camera 1 according to a tenth embodiment of the present invention. Reference numeral 12 is a timer that outputs interruption to the controller 8 by every prescribed time. The controller 8 controls the superimposing device 11 to alternately switches the states for superposing and not superimposing the superimposing data S1 on the image data for every interruption outputted from the timer 12.

Figure 25:
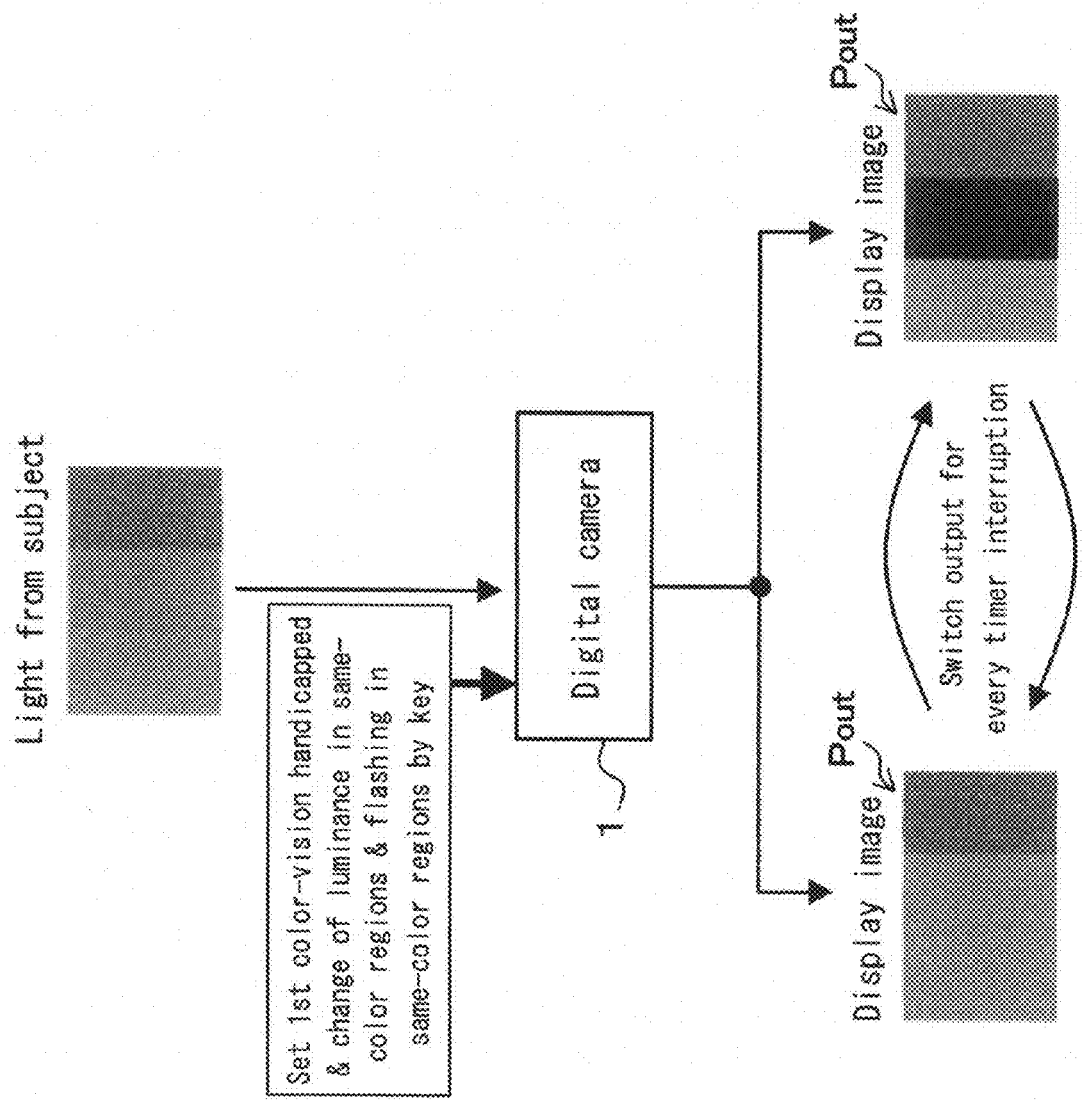
FIG. 25 is an illustration for describing action of the digital camera according to the tenth embodiment.

FIG. 25 shows the effects of the embodiment. The color information of the light from the subject has the green color region in the center, the dark-orange color region on the left, and blue color region on the right. When setting the mode for the first color-vision impairment in the setting device 7, the color region (green) in the center of the light from the subject is changed to the adjacent color region (dark orange) as a result of gain adjustment. Thus, in addition, there are set, in the setting device 7, change of the luminance in either one of the color regions, which have tuned the same color, as well as flashing of the color regions of the same color. Thereby, the superimposing device 11 alternately switches the states for superimposing and not superimposing the superimposing data S1 on the image data in the color regions that have turned the same color, for every interruption outputted from the timer 12. The superimposing device 11 also flash-displays the color regions that have turned the same color due to the gain adjustment by every prescribed time. As a result, visibility of the boundary between the color regions can be improved. The embodiment (addition of the timer 12) can be applied to each of the above-described embodiments.

Eleventh Embodiment

Figure 26:
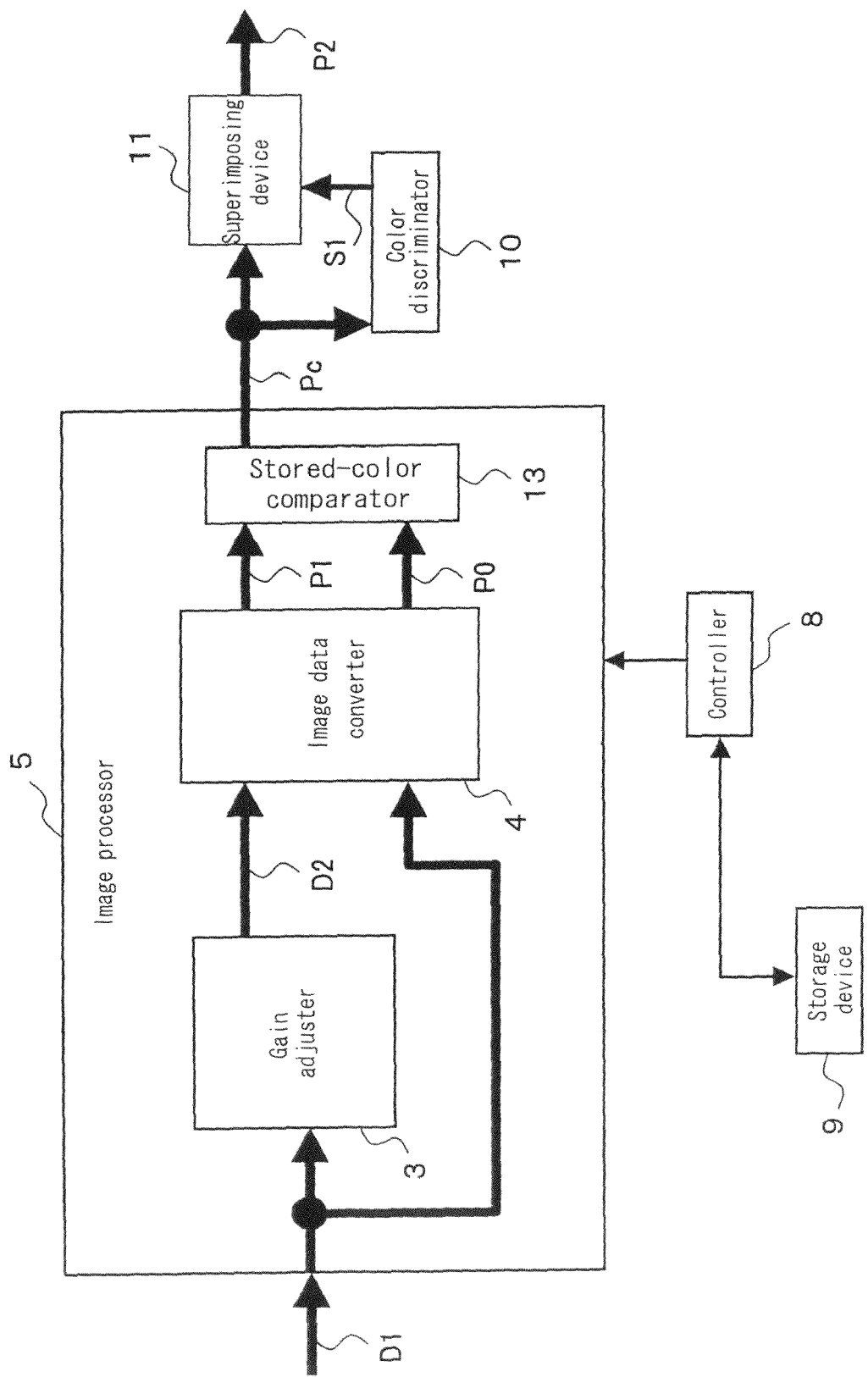
FIG. 26 is a block diagram for showing the structure of a digital camera according to an eleventh embodiment of the present invention.

FIG. 26 is a block diagram for showing the structure of the digital camera 1 according to an eleventh embodiment of the invention. The storage device 9 stores color information of the image data P0 that is not gain-adjusted. The image processor 5 comprises a stored-color comparator 13. The color information of the image data P0 obtained by converting the video signal D1 and the color information of the image data P1 obtained by converting the adjusted video signal D2 is imputed to the stored-color comparator 13. The stored-color comparator 13 compares the image data P0 and the color information with no gain adjustment stored in the storage device 9. When both of the data are consistent, the stored-color comparator 13 outputs the image data P0 as image data Pc and, when inconsistent, outputs the image data P1 as the image data Pc. The image data Pc is transmitted to the displaying device 6 and outputted as the display image Pout. For other structures, the structures of any of the above-described embodiment can be employed.

FIG. 27 shows the effects of the embodiment. In both cases of FIG. 27A and FIG. 27B, the color information of the light from the subject has the green color region in the center, the dark-orange color region on the left, and blue color region on the right.

FIG. 27A shows the state where the mode corresponding to the first color-vision impairment is set in the setting device 7.

The color region (green) in the center is gain-adjusted according to the mode. In the display image Pout, the color region in the center is changed from green to dark orange, the color region on the left stays dark orange, and the color region on the right stays blue. As a result, the color region in the center changes from green to dark orange, which is the same color as the color region (dark orange) on the left. This means that it is not possible for the first color-vision impairment to discriminate the boundary between the color region (green) and the color region (dark orange) of the color information of the light from the subject.

Thus, as shown in FIG. 27B, change of the luminance in the same color regions are set in the setting device 7 and, at the same time, green is set as the color to have no gain adjustment. That is, a specific color (wavelength) without gain adjustment is outputted in accordance with each characteristic of the color-vision handicapped. As a result, in the case where the color information is corrected in one's brain by the memorized color of the color-vision handicapped, it is possible to know how it is corrected even though it is actually a different color.

The embodiment (the structure of storing the unadjusted color) can be applied not only to the embodiments (the eighth embodiment and the like) where color conversion of the entire specific color region is controlled, but also to the embodiments (fourth, fifth embodiments, etc.) where color conversion of the boundaries around the specific color region is controlled.

The present invention is not limited to the above-described embodiments but may be embodied as follows.

(1) In each of the above-described embodiments, expressions of Ye=R+G, Cy=B+G, Mg=R+B,G are applied for converting the colors from the complementary color to the primary color. However, it is not limited to those. Prescribed coefficients a-f may be used for achieving conversion such as Ye=a*R+b*G, Cy=c*B+d*G, Mg=e*R+f*B,G.

(2) In each of the above-described embodiments, the superimposing data S1 is superimposed on the image data P1. However, the value of the image data P1 itself may be adjusted.

The present invention has been described in detail by referring to the most preferred embodiments. However, various combinations and modifications of the components are possible without departing from the sprit and the broad scope of the appended claims.

What is claimed is:

1. A digital camera, comprising:
an image-taking device for converting light from a subject to a video signal and outputting said video signal;
a gain adjuster which performs gain adjustment individually for respective color information of R, G, B of said video signal outputted from said image-taking device, and outputs an adjusted video signal;
an image data converter for converting said adjusted video signal outputted from said gain adjuster into image data;
a displaying device for displaying said image data;
a setting device in which gain adjusting amounts for said respective color information are set;
a controller for controlling said gain adjuster such that gain adjustment is performed individually on said respective color information according to said gain adjusting amounts set in said setting device;
a color discriminator for discriminating a boundary between two color regions which are adjacent to each other in said image data on a plane; and
a superimposing device that generates superimposing data, which is data where at least one of luminance, hue, or saturation is changed in said boundary discriminated by said color discriminator, and superimposes said superimposing data on said image data,
wherein said controller controls said color discriminator and said superimposing device.

2. The digital camera according to claim 1, wherein:
said image data converter outputs both of image data obtained by converting said video signal with no gain adjustment, and image data obtained by converting said adjusted video signal with gain adjustment;
said color discriminator further discriminates a difference between color information of two color regions of said image data that is obtained by converting said video signal with no gain adjustment and color information of said two color regions of said image data that is obtained by converting said adjusted video signal; and
said superimposing device, from a result of discrimination by said color discriminator, generates said superimposing data exclusively for a color region that satisfy below conditions of A), B), and superimposes said superimposing data on said image data that is obtained by converting said adjusted video signal,
A) in said image data obtained by converting said video signal with no gain adjustment, color information differs between said two color regions of said image data obtained by converting said video signal with no gain adjustment, and
B) in said image data obtained by converting said adjusted video signal, hues are same for said two color regions of said image data obtained by converting said adjusted video signal.

3. The digital camera according to claim 2, further comprising a timer for outputting interruption by every prescribed time, wherein
said controller controls said superimposing device to switch superimposing and non-superimposing of said superimposing data for every said interruption outputted from said timer.

4. The digital camera according to claim 2, wherein said storage device further stores unadjusted color that has no gain adjustment performed, said digital camera further comprising:
a stored color comparator which compares color information of each of said color regions of said image data obtained by converting said video signal with said unadjusted color and, when consistent, outputs said image data obtained by converting said video signal to said color regions, while outputting said image data obtained by converting said adjusted video signal to said color regions when inconsistent.

5. A digital camera, comprising:
an image-taking device for converting light from a subject to a video signal and outputting said video signal;
a gain adjuster which performs gain adjustment individually for respective color information of R, G, B of said video signal outputted from said image-taking device, and outputs an adjusted video signal;
an image data converter for outputting both image data obtained by converting said video signal with no gain adjustment, and image data obtained by converting said adjusted video signal;
a displaying device for displaying said image data obtained by converting said adjusted video signal;
a setting device in which gain adjusting amounts for said respective color information are set; and
a controller for controlling said gain adjuster such that gain adjustment is performed individually on said respective color information according to said gain adjusting amounts set in said setting device;

a color discriminator for discriminating a difference between color information of two color regions of said image data obtained by converting said video signal with no gain adjustment and color information of two color regions of said image data obtained by converting said adjusted video signal;

a superimposing device that generates, from a result of discrimination by said color discriminator, superimposing data where at least one of luminance, hue, or saturation is changed in either one of said two color regions that satisfy below conditions A), B), and superimposes said superimposing data on said image obtained by converting said adjusted video signal, said controller controls said color discriminator and said superimposing device;

A) in said image data obtained by converting said video signal, color information differs between said two color regions of said image data obtained by converting said video signal with no gain adjustment, and B) in said image data obtained by converting said adjusted video signal, hues are same for said two color regions of said image data obtained by converting said adjusted video signal.

6. The digital camera according to claim 5, further comprising a timer for outputting interruption by every prescribed time, wherein said controller controls said superimposing device to switch superimposing and non-superimposing of said superimposing data for every said interruption outputted from said timer.

* * * * *